United States Patent
Chen et al.

(10) Patent No.: US 10,529,384 B2
(45) Date of Patent: Jan. 7, 2020

(54) VIDEO RECORDING METHOD AND APPARATUS FOR MOBILE TERMINAL

(71) Applicant: TENCENT TECHNOLOGY (SHENZHEN) COMPANY LIMITED, Guangdong (CN)

(72) Inventors: Jian hong Chen, Guangdong (CN); Jia chun Ke, Guangdong (CN); Ning Jiang, Guangdong (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 0 days.

(21) Appl. No.: 15/762,889

(22) PCT Filed: Feb. 10, 2017

(86) PCT No.: PCT/CN2017/073224
§ 371 (c)(1),
(2) Date: Mar. 23, 2018

(87) PCT Pub. No.: WO2017/140229
PCT Pub. Date: Aug. 24, 2017

(65) Prior Publication Data
US 2018/0268870 A1  Sep. 20, 2018

(30) Foreign Application Priority Data
Feb. 17, 2016 (CN) .......................... 2016 1 0089724

(51) Int. Cl.
*G11B 27/36* (2006.01)
*G11B 27/34* (2006.01)
*H04N 5/765* (2006.01)

(52) U.S. Cl.
CPC .............. *G11B 27/36* (2013.01); *G11B 27/34* (2013.01); *H04N 5/765* (2013.01)

(58) Field of Classification Search
CPC ........ G11B 27/36; G11B 27/34; H04N 5/765; H04N 21/274; H04N 21/6581; H04N 21/6587
See application file for complete search history.

(56) References Cited

U.S. PATENT DOCUMENTS

2003/0093790 A1* 5/2003 Logan ................. G10H 1/0033
725/38
2010/0186038 A1* 7/2010 Thomas ........... H04N 21/47202
725/42

(Continued)

FOREIGN PATENT DOCUMENTS

CN          103747362 A    4/2014
CN          104427352 A    3/2015

(Continued)

OTHER PUBLICATIONS

International Search Report for PCT/CN2017/073224, dated Apr. 5, 2017.

(Continued)

*Primary Examiner* — Mishawn N. Hunter
(74) *Attorney, Agent, or Firm* — Sughrue Mion, PLLC

(57) ABSTRACT

This application discloses a video recording method and apparatus of a mobile terminal. The video recording method includes obtaining a target video that is played online, controlling to display a video recording page in which the target video is played, and receiving, via the video recording page that is displayed, a recording instruction for recording the target video. The video recording method further includes entering a recording mode to record the target video, in response to the recording instruction being received, to obtain a first video clip corresponding to video data of the target video, and generating a recorded video of the target video, based on the first video clip.

19 Claims, 21 Drawing Sheets

(56) References Cited

U.S. PATENT DOCUMENTS

2011/0264793 A1* 10/2011 Goldman ............... H04H 20/82
                                                                709/224
2013/0021535 A1   1/2013 Kim et al.

FOREIGN PATENT DOCUMENTS

| | | |
|---|---|---|
| CN | 104427404 A | 3/2015 |
| CN | 105657498 A | 6/2016 |
| JP | 10285503 A | 10/1998 |
| JP | 2004015224 A | 1/2004 |
| JP | 2004193827 A | 7/2004 |
| JP | 2005102128 A | 4/2005 |
| JP | 2008167411 A | 7/2008 |
| JP | 2008187505 A | 8/2008 |
| KR | 10-2013-0083935 A | 7/2013 |
| WO | 02/069636 A1 | 9/2002 |

OTHER PUBLICATIONS

Communication dated Jul. 25, 2019, from the European Patent Office in application No. 17752661.3.
Communication dated Aug. 28, 2019 issued by the Korean Intellectual Property Office in counterpart application No. 10-2018-7019694.
Communication dated Aug. 19, 2019, from the Japanese Patent Office in application No. 2018-536199.

\* cited by examiner

US 10,529,384 B2

VIDEO RECORDING METHOD AND APPARATUS FOR MOBILE TERMINAL

CROSS-REFERENCE TO RELATED APPLICATION

This application is a U.S. national stage application under 35 U.S.C. § 371 of International Patent Application No. PCT/CN2017/073224, filed on Feb. 10, 2017, which claims priority from Chinese Patent Application No. 201610089724.7, entitled "VIDEO RECORDING METHOD AND APPARATUS OF MOBILE TERMINAL," filed on Feb. 17, 2016, in the Chinese Patent Office, the disclosure of which is incorporated herein by reference in its entirety.

BACKGROUND

1. Field

Methods and apparatuses consistent with example embodiments relate to videos, and specifically, to a video recording method and apparatus of a mobile terminal.

2. Description of Related Art

Currently, a video application may be installed on a mobile terminal, and the video application (APP for short) enables a user terminal to download and watch videos and share films or short films, so that the mobile terminal can obtain videos. However, when a user watches a video clip that the user is interested in, because none of video applications has a function of recording a video clip played online, the user cannot save the video clip that the user is interested in.

SUMMARY

According to example embodiments, there is provided a video recording method of a mobile terminal, the method including obtaining a target video that is played online, controlling to display a video recording page in which the target video is played, and receiving, via the video recording page that is displayed, a recording instruction for recording the target video. The method further includes entering a recording mode to record the target video, in response to the recording instruction being received, to obtain a first video clip corresponding to video data of the target video; and generating a recorded video of the target video, based on the first video clip.

According to example embodiments, there is provided a video recording apparatus of a mobile terminal, the apparatus including a processor, and a memory storing instructions executable by the processor to cause the processor to obtain a target video that is played online, control to display a video recording page in which the target video is played, and receive, via the video recording page that is displayed, a recording instruction for recording the target video. The instructions are further executable by the processor to cause the processor to enter a recording mode to record the target video, in response to the recording instruction being received, to obtain a first video clip corresponding to video data of the target video, and generate a recorded video of the target video, based on the first video clip.

According to example embodiments, there is provided a non-transitory computer-readable storage medium storing a program including instructions executable by a processor to cause the processor to obtain a target video that is played online, control to display a video recording page in which the target video is played, and receive, via the video recording page that is displayed, a recording instruction for recording the target video. The instructions are further executable by the processor to cause the processor to enter a recording mode to record the target video, in response to the recording instruction being received, to obtain a first video clip corresponding to video data of the target video, and generate a recorded video of the target video, based on the first video clip.

BRIEF DESCRIPTION OF THE DRAWINGS

The accompanying drawings described herein are used for providing further understanding for this application and constitute a part of this application. Example embodiments of this application and descriptions thereof are used for explaining this application and do not constitute an improper limitation to this application. In the figures.

DETAILED DESCRIPTION OF THE EXAMPLE EMBODIMENTS

To make a person skilled in the art better understand solutions of this application, the following clearly and completely describes the technical solutions in example embodiments of this application with reference to the accompanying drawings in the example embodiments of this application. Apparently, the described example embodiments are some rather than all of the example embodiments of this application.

It may be noted that in the specification, claims, and accompanying drawings of this application, the terms "first," "second," and so on are intended to distinguish between similar objects rather than indicating a specific order. It may be understood that data used in this way can be interchanged in an appropriate case, so that the example embodiments of this application that are described herein can be implemented in a sequence other than those sequences illustrated or described herein. Moreover, the terms "include," "contain" and any other variants mean to cover the non-exclusive inclusion. For example, a process, method, system, product, or device that includes a series of steps or units is not necessarily limited to those steps or units that are expressly listed, but may include other steps or units not expressly listed or inherent to such a process, method, product, or device.

Figure 1:
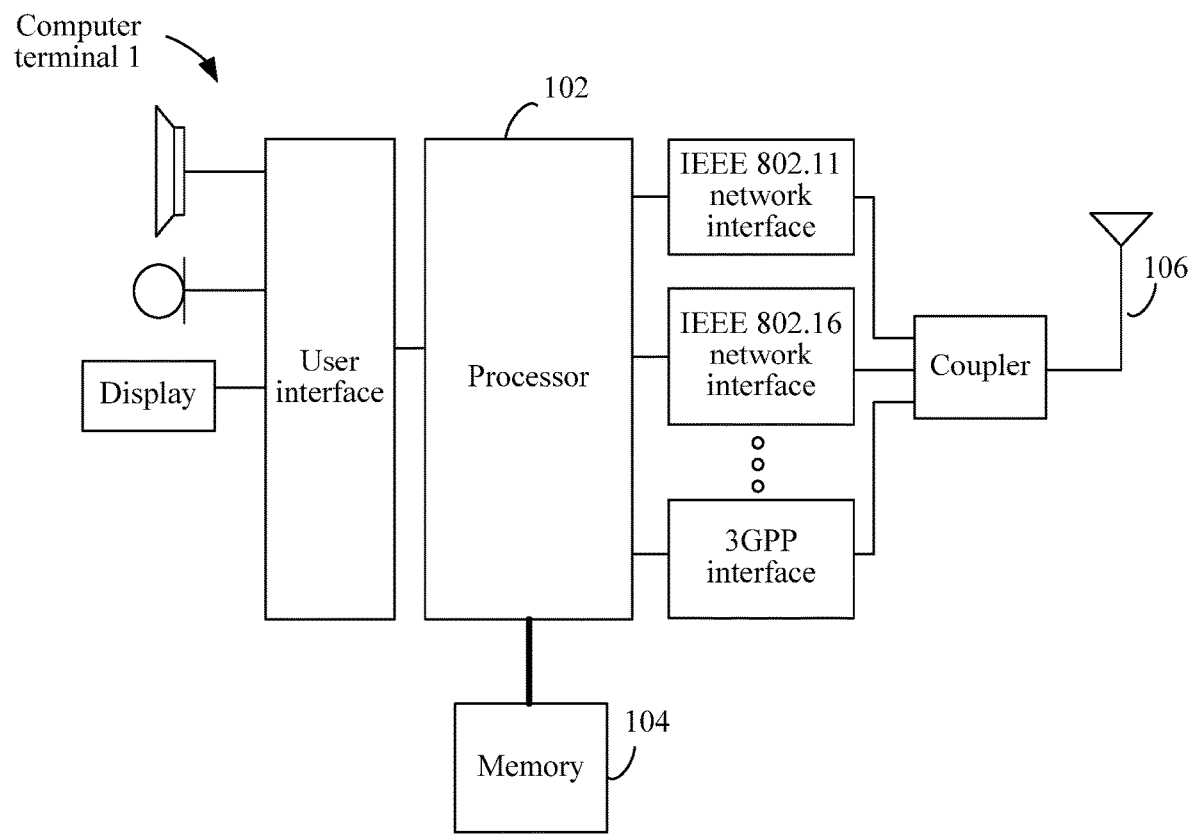
FIG. 1 is a block diagram of a hardware structure of a computer terminal in a video recording method of a mobile terminal according to an example embodiment of this application.

Example embodiments of this application provide a video recording method of a mobile terminal. It may be noted that steps shown in flowcharts of the accompanying drawings may be performed in a computer system such as a group of computer executable instructions. In addition, although logic sequences are shown in the flowcharts, in some cases, the shown or described steps may be performed in sequences different from those The method provided in the example embodiments of this application may be performed in a mobile terminal, a computer terminal, or a similar operation apparatus. FIG. 1 is a block diagram of a hardware structure of a computer terminal 1 in a video recording method of a mobile terminal according to an example embodiment of this application. As shown in FIG. 1, the computer terminal 1 may include one or more (only one is shown in the figure) processors 102 (the processor 102 may include, but is not limited to, a processing apparatus such as a micro processor (MCU) or a programmable logic device (FPGA)), a memory 104 for storing data, and a transmission apparatus 106 for a communication function. The structure shown in FIG. 1 is an example and shall not be construed as a limitation to the structure of the foregoing electronic apparatus. For example, the computer terminal 1 may also include more or fewer components than those shown in FIG. 1, or have a configuration different from that shown in FIG. 1.

The memory 104 may be configured to store a software program of application software and a module, for example, a program instruction/module corresponding to the video recording method of a mobile terminal in the example embodiments of this application, and the processor 102 executes various functional applications and data processing by running the software program and the module stored in the memory 104, that is, implementing the foregoing video recording method of a mobile terminal. The memory 104 may include a high-speed random memory, and may also include a nonvolatile memory such as one or more magnetic storage devices, a flash memory, or another nonvolatile solid-state memory. In some examples, the memory 104 may further include memories remotely disposed relative to the processor 102, and these remote memories may be connected to the computer terminal 1 through a network. Examples of the network include, but are not limited to, the Internet, an intranet, a local area network, a mobile communications network, and a combination thereof.

The transmission apparatus 106 is configured to receive or send data through a network. Examples of the network may include a wireless network provided by a communications supplier of the computer terminal 1. In an example, the transmission apparatus 106 includes a network interface controller (NIC) that may be connected to another network device by using a base station, thereby communicating with the Internet. In an example, the transmission apparatus 106 may be a radio frequency (RF) module that is configured to communicate with the Internet in a wireless manner.

Figure 2:
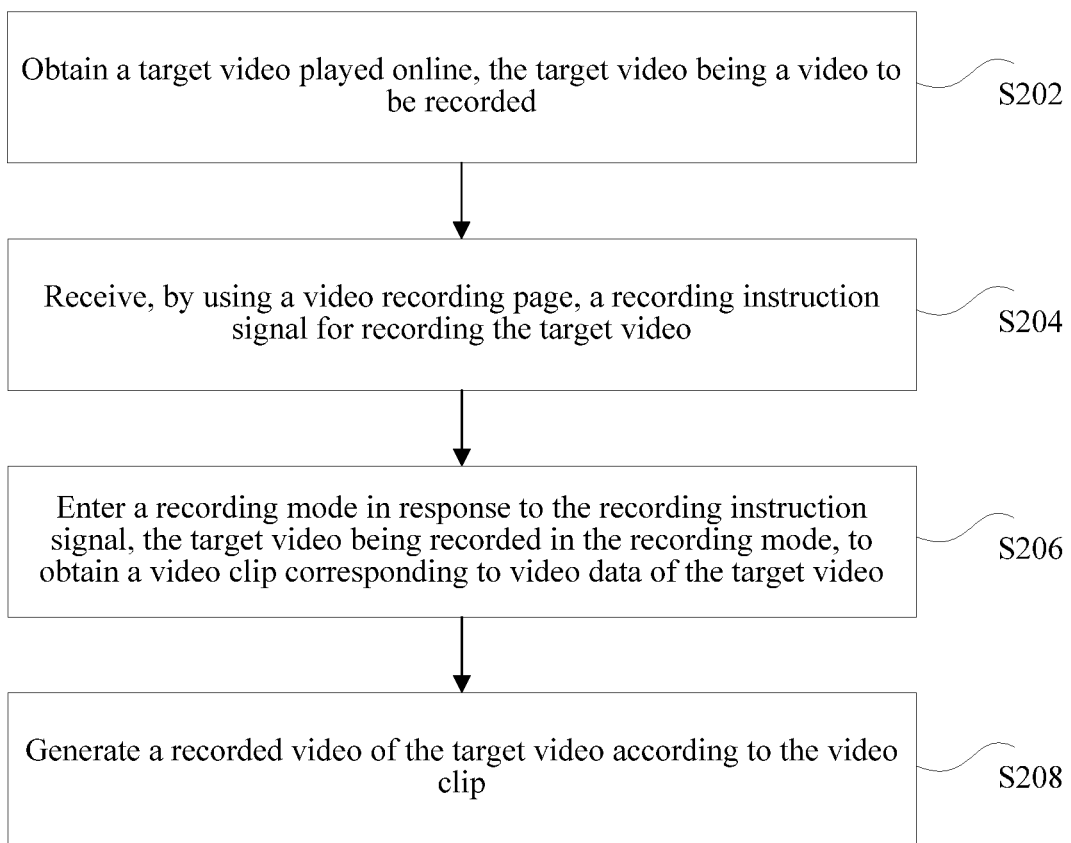
FIG. 2 is a flowchart of a video recording method of a mobile terminal according to a first example embodiment of this application.

In the foregoing running environment, this application provides a video recording method of a mobile terminal as shown in FIG. 2. The video recording method of a mobile terminal may be applied to a smart terminal device and may be performed by a processor in the smart terminal device. The smart terminal device may be a smartphone, a tablet computer, and the like. At least one application is installed in the smart terminal device. This example embodiment of this application does not limit types of the application that may be a system application or a software application. The application in this example embodiment of this application includes at least one application function.

FIG. 2 is a flowchart of a video recording method of a mobile terminal according to a first example embodiment of this application. As shown in FIG. 2, an optional solution of the video recording method of a mobile terminal includes the following steps:

Step S202: Obtain a target video played online, the target video being a video to be recorded.

In the solution provided in step S202 of this application, pictures associated with each other are continuously played, to provide a feeling of watching continuous frames to eyes, to form a video effect. A video is composed of video clips, and a video composed of a small clip in the video is a small video. A picture in the video is a frame in the video, and a serial number of the picture in the video is a frame number (Frame ID). For a given video, a picture may be uniquely positioned according to a frame number.

In a process of online watching a video by using a network, when encountering with a video that a user terminal is interested in, the user terminal intends to record the video that the user terminal is interested in. In this case, the video becomes a target video. Video content that the user terminal is interested in is a video to be recorded, and the video to be recorded is the target video. The mobile terminal may play the target video online by using a terminal video APP. The terminal video APP is a Tencent terminal video APP that provides a function of a video player and may play a video in a full-screen mode. The video APP may be installed on an iPhone terminal or an Android terminal.

The target video is obtained by online searching, by the user terminal, for the target video by using the terminal video APP. When the target video is played online, the target video is obtained by the terminal video APP installed on the mobile terminal.

In this example embodiment of this application, the terminal video APP determines the video to be recorded, thereby obtaining the target video played online.

Step S204: Receive, by using a video recording page, a recording instruction signal for recording the target video.

In the solution provided in step S204 of this application, to obtain the video that the user terminal is interested in, the user terminal may record the target video by using the mobile terminal. The mobile terminal receives, by using the video recording page, the recording instruction signal for recording the target video, and the recording instruction signal is used for instructing to record the target video. Optionally, when the recording instruction signal is generated, the target video is recorded, and when the recording instruction signal does not exist, recording of the target video stops. The recording instruction signal may be generated by long-pressing, by the user terminal, a record key on the video recording page, and when the user terminal stops pressing the record key, the recording instruction signal is canceled.

Optionally, the terminal video APP on the mobile terminal has a video recording page, and the video recording page includes a function key related to video recording. The function key related to video recording may be triggered by tapping or double-tapping by the user terminal, or by touching within a preset range of the video recording page for a preset time, so that the mobile terminal executes a function related to video recording. The function key related to video recording on the video recording page includes a function key for receiving the recording instruction signal for recording the target video, for example, the record key. Recording of the target video starts after the record key is touched. After being touched, the record key may prompt, by changing colors or changing animation, the user terminal that the record key is touched. For example, after the record key is touched, the record key becomes orange, or wave animation appears around the record key, or the record key becomes orange while wave animation appears around the record key.

In this example embodiment of this application, the recording instruction signal for recording the target video may be received by using the video recording page in multiple manners. The receiving, by using a video recording page, a recording instruction signal for recording the target video is an example embodiment of this application and does not indicate that the receiving, by using a video recording page, a recording instruction signal for recording the target video in this example embodiment of this application includes only the foregoing manner. To enhance flexibility of the receiving, by using a video recording page, a recording instruction signal for recording the target video, this example embodiment of this application may further include other manners of the receiving, by using a video recording page, a recording instruction signal for recording the target video.

In this example embodiment of this application, after the target video played online is obtained, the recording instruction signal for recording the target video is received by using the video recording page, to obtain the recording instruction signal, to record the target video.

Step S206: Enter a recording mode in response to the recording instruction signal, the target video being recorded in the recording mode, to obtain a video clip corresponding to video data of the target video.

In the solution provided in step S206 of this application, the mobile terminal has the recording mode with the use of the terminal video APP and may perform an operation related to recording of the target video in the recording mode, for example, operations such as starting recording of the target video, pausing recording of the target video, and viewing the recording state of the recorded video. When the recording instruction signal for recording the target video is received by using the video recording page, the mobile terminal enters the recording mode in response to the recording instruction signal. The target video is recorded in the recording mode. Optionally, when the video recording page receives the recording instruction signal, the target video is in an unrecorded state, and in a process that the video recording page receives the recording instruction signal, the target video keeps being recorded, and the target video is in a recording state. When the video recording page does not receive the recording instruction signal, recording of the target video stops. For example, the user terminal generates the recording instruction signal by long-pressing the record key on the video recording page, and recording of the target video starts. When the user terminal does not press the record key, recording of the target video stops.

When the target video is recorded in response to the recording instruction signal, when recording of the target video starts, a recording start frame number (Frame ID1) of the target video is obtained. When recording of the target video ends, a recording stop frame number (Frame ID2) of the target video is obtained, video data, from starting recording to stopping recording, of the target video is obtained, to obtain the video clip corresponding to the video data of the target video. Optionally, a video composed of the video clip forms a small video, and the small video is a part of a video continuously played in the target video, that is, a part of a video that the user terminal is interested in and that is in the target video. The small video may be composed of multiple video clips, which are video clips in which pictures associated with each other are continuously played.

In this example embodiment of this application, the recording mode is entered in response to the recording instruction signal, the target video being recorded in the recording mode, to obtain the video clip corresponding to the video data of the target video.

Step S208: Generate a recorded video of the target video according to the video clip.

In the solution provided in step S208 of this application, after the recording mode is entered in response to the recording instruction signal, the recorded video of the target video is generated according to the video clip. The recorded video may be whole content of the target video or may be a part of a video continuously played in the target video. The recorded video may be saved locally or may be uploaded to a server and be shared to friends by using the server, for example, shared to the WeChat Moments or the Qzone. The recorded video may be directly played and previewed, so that the user terminal views an effect of recording the target video and decides whether to record the target video again. The recorded video may be uniquely determined, that is, content of the small video may be uniquely determined, by using an identity (ID for short), the recording start frame number, and the recording stop frame number of the target video.

According to step S202 to step S208, in this example embodiment of this application, the target video played online is obtained, the target video being the video to be recorded; the recording instruction signal for recording the target video is received by using the video recording page; the recording mode is entered in response to the recording instruction signal, the target video being recorded in the recording mode, to obtain the video clip corresponding to the video data of the target video; and the recorded video of the target video is generated according to the video clip, thereby recording an online video. The user terminal may record video content that the user terminal is interested in while watching an online video, thereby improving performance experience of the user terminal.

Figure 3:
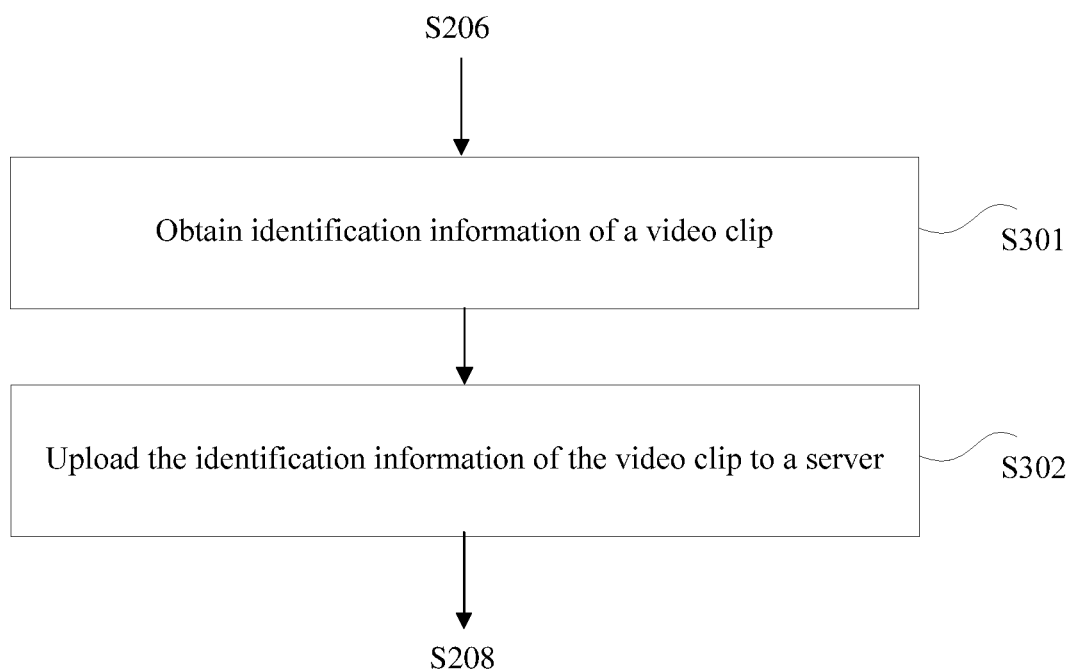
FIG. 3 is a flowchart of a video recording method of a mobile terminal according to a second example embodiment of this application.

In an optional implementation, after the recording mode is entered in response to the recording instruction signal in step S206 of this application, identification information of the video clip is obtained, and the identification information of the video clip is uploaded to the server, as shown in FIG. 3 below.

FIG. 3 is a flowchart of a video recording method of a mobile terminal according to a second example embodiment of this application. As shown in FIG. 3, the video recording method of a mobile terminal further includes the following steps:

Step S301: Obtain identification information of the video clip.

The video clip has the identification information, and the identification information, that is, digest information of the video clip, is used for uniquely determining information about the video clip. The identification information of the video clip is obtained after the recording mode is entered in response to the recording instruction signal, where the identification information is information for determining the video clip.

Step S302: Upload the identification information of the video clip to a server.

The identification information of the video clip is uploaded to the server, where the server searches for a video clip corresponding to the identification information of the video clip and generates a recorded video of a target video according to the found video clip. After generating the recorded video of the target video according to the found video clip, the server may send the recorded video to other terminals by using the server, thereby implementing sharing of the recorded video.

Binary transfer is a method that is frequently used in a large file transmission process that avoids a real file transmission process by verifying digest information of a file. For example, for each file uploaded to a network disk, the server verifies md5 code of the file. If the uploaded md5 code is the same as md5 code of a file already existing in the server, a network disk server determines that the file is a repeated file. Only a copy needs to be copied and saved on the network disk, and an original file does not need to be saved again. An uploading task may be done very quickly. In addition, when someone needs to download the file, a download address of the original file is sent out, thereby implementing efficient running of the server, to check in the server, by calculating an md5 value of the digest information of the file, whether the file exists on the server when the file is uploaded by using the network disk. If it is found by using the md5 value of the digest information that the file exists on the server, no real network file transmission operation needs to be performed on the file, to upload the file to the server.

In this example embodiment, the video clip may be uploaded to the server by using the foregoing binary transfer method. Optionally, the identification information of the video clip is first obtained; the identification information of the video clip is uploaded to the server; the server checks, according to the identification information of the video clip, whether the video clip exists on the server; if it is found according to the identification information of the video clip that the video clip exists on the server, no real network video clip transmission operation needs to be performed on the video clip. The server performs an encoding and decoding operation on the video clip according to the identification information of the video clip and generates the recorded video corresponding to the video clip again. Therefore, a real video clip transmission process does not need to be performed.

In this example embodiment of this application, the identification information of the video clip is obtained, where the identification information is information for determining the video clip; the identification information of the video clip is uploaded to the server, where the server searches for the video clip corresponding to the identification information of the video clip and generates the recorded video of the target video according to the found video clip, to generate the recorded video in the server.

In another optional implementation, the identification information of the video clip is an ID of the target video, and a recording start frame number and a recording stop frame number when the target video is recorded. The recording start frame number of the video is a serial number of a picture in the target video when recording of the target video starts. The recording start frame number has a unique location in the target video. The recording stop frame number is a serial number of a picture in the target video when recording of the target video ends. The recording stop frame number has a unique location in the target video. The obtaining identification information of the video clip includes: obtaining an ID, a recording start frame number, and a recording stop frame number of the target video; and the uploading the identification information of the video clip to a server includes: uploading the ID, the recording start frame number, and the recording stop frame number of the target video to the server. After the ID, the recording start frame number, and the recording stop frame number of the target video are uploaded to the server, the server searches for a video clip between the recording start frame number and the recording stop frame number according to the ID of the target video, performs an encoding and decoding operation on the video clip between the recording start frame number and the recording stop frame number, and generates a recorded video corresponding to the video clip between the recording start frame number and the recording stop frame number. The recorded video may be a small video composed of a small clip in the target video.

After step S302 is performed, the method may continue in step S208 of FIG. 2.

In another optional implementation, referring again to FIG. 2, in step S206, a recording mode is entered in response to the recording instruction signal, the target video being recorded in the recording mode, to obtain a video clip corresponding to video data of the target video, as detailed with respect to FIG. 4 below.

Figure 4:
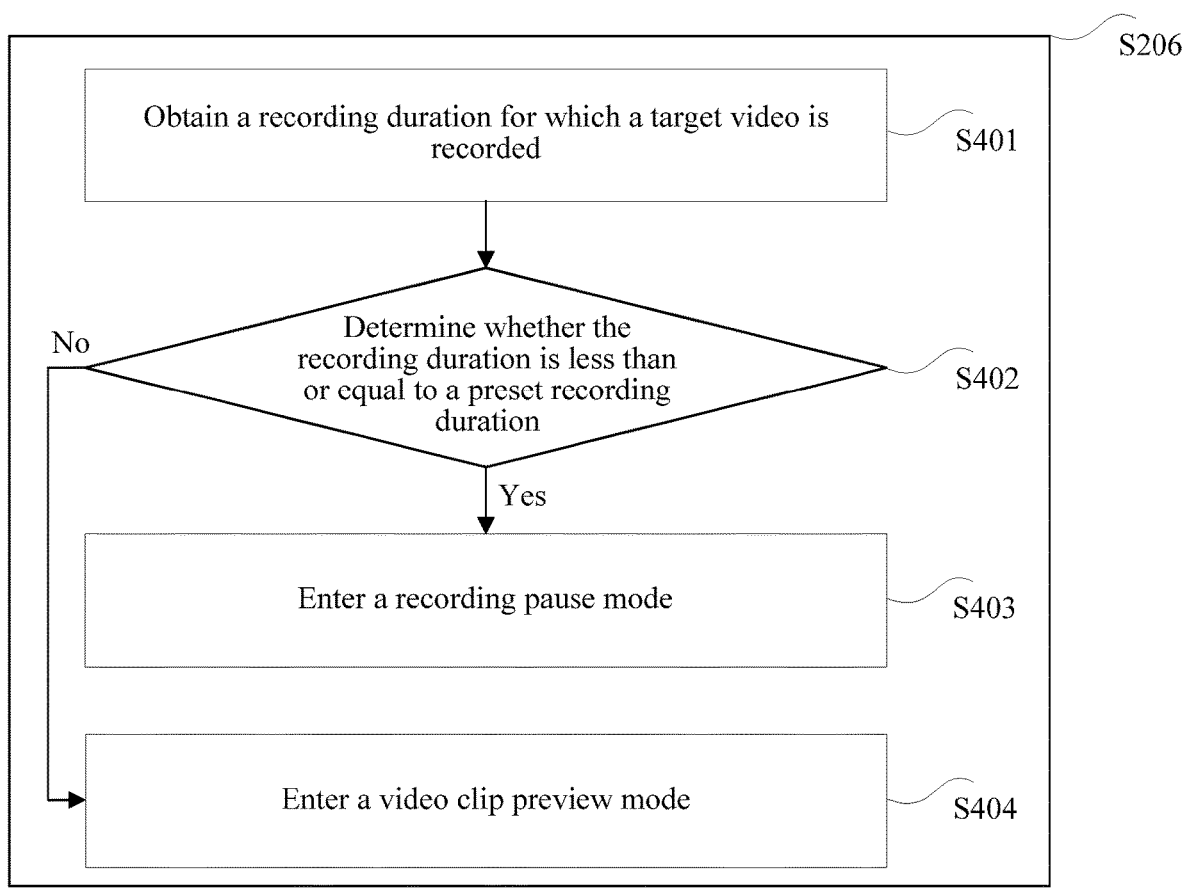
FIG. 4 is a flowchart of a method for entering a recording mode in response to a recording instruction signal according to the first example embodiment of this application.

FIG. 4 is a flowchart of a method for entering a recording mode in response to a recording instruction signal according to the first example embodiment of this application. As shown in FIG. 4, the entering a recording mode in response to the recording instruction signal (e.g., step S206 of FIG. 2) includes the following steps:

Step S401: Obtain a recording duration for which the target video is recorded.

After the recording instruction signal for recording the target video is received by using the video recording page, recording of the target video starts. Optionally, the video recording page continuously receives the recording instruction signal, and the target video keeps in the recording state. When the video recording page does not receive the recording instruction signal, recording of the target video stops. For example, a finger of the user terminal keeps touching the record key on the video recording page, and the target video keeps in the recording state. After the finger of the user terminal leaves the record key of the recording page, recording of the target video stops. The recording duration for which the target video is recorded is obtained. The recording duration is a period of time for which the recording instruction signal has been received by using the video recording page before the recording instruction signal stops being received by using the video recording page.

Step S402: Determine whether the recording duration is less than or equal to a preset recording duration.

After the recording duration for which the target video is recorded is obtained, whether the recording duration is less than or equal to the preset recording duration is determined. When the recording duration is excessively short, the recording duration is not long enough for the terminal to generate, by using a video terminal APP, continuous frames recognizable to eyes, so that the recording duration is not long enough to generate the video clip. The preset recording duration is a period of time for determining whether the recorded video can be generated.

Step S403: Enter a recording pause mode if it is determined that the recording duration is less than or equal to the preset recording duration.

After it is determined whether the recording duration is less than or equal to the preset recording duration, the recording pause mode is entered if it is determined that the recording duration is less than or equal to the preset recording duration. Recording of the target video is paused in the recording pause mode, that is, the mobile terminal pauses recording of the target video by using the video terminal APP. In the recording pause mode, the recording page displays a function key in the recording pause mode, and recording of the target video is paused by using the function key in the recording pause mode. The recording page may further display prompt information, used for prompting operation information of pausing of recording of the target video. The recording mode is entered when the video recording page receives the recording instruction signal again. Recording of the target video may continue, so that the target video is in the recording state.

Step S404: Enter a video clip preview mode if it is determined that the recording duration is greater than the preset recording duration.

After it is determined whether the recording duration is less than or equal to the preset recording duration, the video clip preview mode is entered if it is determined that the recording duration is greater than the preset recording duration, where the recorded video corresponding to the video clip is displayed in the video clip preview mode, that is, the mobile terminal previews the recorded video of the target video by using the video terminal APP. Optionally, a period of time for which the recording instruction signal has been received by the video recording page is detected. Once it is detected that the period of time for which the recording instruction signal has been received by using the video recording page is greater than maximum preset recording duration, a process of recording the target video automatically ends, and then the video clip preview mode is entered. In the video clip preview mode, the recording page displays the function key in the video clip preview mode, and the recorded video is displayed by using the function key in the video clip preview mode, thereby implementing online recording of the target video and improving performance experience of a user on the recorded video.

In this example embodiment of this application, the recording duration for which the target video is recorded is obtained; whether the recording duration is less than or equal to the preset recording duration is determined; the recording pause mode is entered if it is determined that the recording duration is less than or equal to the preset recording duration; the video clip preview mode is entered if it is determined that the recording duration is greater than the preset recording duration, so that the mobile terminal enters the recording mode in response to the recording instruction signal, thereby implementing online recording of the target video and improving performance experience of the user on the recorded video.

In another optional implementation, in step S403, a recording pause mode is entered if it is determined that the recording duration is less than or equal to the preset recording duration, as detailed with respect to FIG. 5 below.

Figure 5:
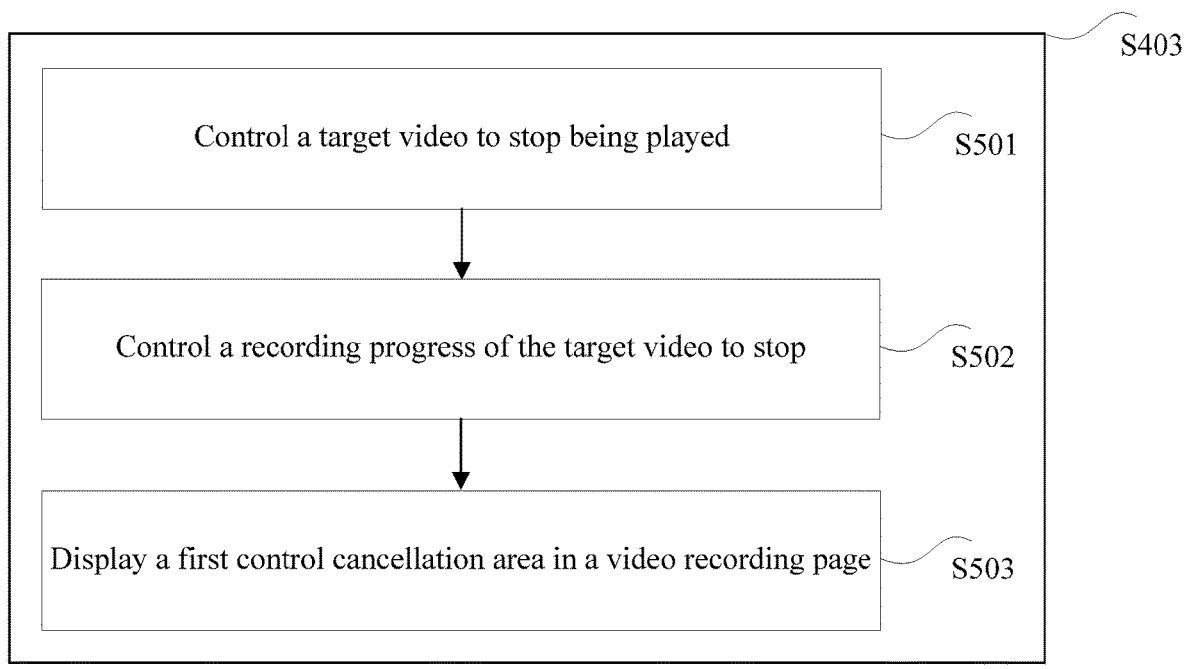
FIG. 5 is a flowchart of a method for entering a recording pause mode according to an example embodiment of this application.

FIG. 5 is a flowchart of a method for entering a recording pause mode according to an example embodiment of this application. As shown in FIG. 5, the method for entering a recording pause mode (e.g., step S403 of FIG. 4) includes the following steps:

Step S501: Control a target video to stop being played.

When the target video is played, the target video is controlled to stop being played in a recording pause mode.

Step S502: Control a recording progress of the target video to stop.

A recording duration of the target video corresponds to a recording progress of the target video. The recording progress of the target video is controlled to stop in the recording pause mode. The recording progress of the target video may be displayed on a video recording page. For example, the recording progress of the target video is displayed by using color information, or the recording progress of the target video is displayed by using changes of shades of colors, or the recording progress of the target video is displayed by using a color display progress bar.

Step S503: Display a first control cancellation area on a video recording page.

The first control cancellation area is displayed on the video recording page, where recording of the target video is canceled when a first instruction cancellation signal is received by using the first control cancellation area. The first control cancellation area may be a cancellation key. When the video recording page receives the first instruction cancellation signal by using the cancellation key, recording of the target video is canceled, and the target video recovers to an unrecorded state and may continue being played.

In this example embodiment of this application, the target video is controlled to stop being played; the recording progress of the target video is controlled to stop; the first control cancellation area is displayed on the video recording page, where recording of the target video is canceled when the first instruction cancellation signal is received by using the first control cancellation area, so that the recording pause mode is entered when it is determined that the recording duration is less than or equal to the preset recording duration.

Figure 6:
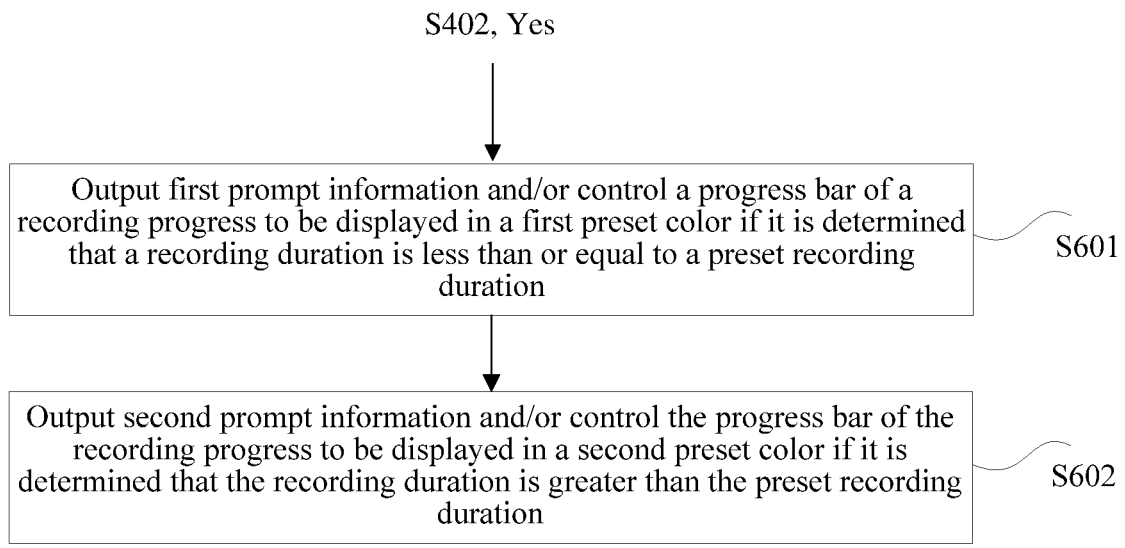
FIG. 6 is a flowchart of a method for entering a recording mode in response to a recording instruction signal according to the second example embodiment of this application.

FIG. 6 is a flowchart of a method for entering a recording mode in response to a recording instruction signal according to the second example embodiment of this application. As shown in FIG. 6, after the determining whether the recording duration is less than or equal to a preset recording duration, in step S402 of FIG. 4, the method for entering a recording mode in response to a recording instruction signal (e.g., step S206 of FIG. 2) further includes the following steps:

Step S601: Output first prompt information and/or control a progress bar of the recording progress to be displayed in a first preset color if it is determined that the recording duration is less than or equal to the preset recording duration.

After it is determined whether the recording duration is less than or equal to the preset recording duration, if it is determined that the recording duration is less than or equal to the preset recording duration, the first prompt information is output, where the first prompt information is operation information for prompting to continue generating the video clip, and/or the progress bar of the recording progress is controlled to be displayed in the first preset color. For example, when the preset duration is three seconds, if it is determined that the recording duration is less than or equal to three seconds, the video recording page displays the first prompt information as "long-press for more than three seconds," and it indicates that when the recording duration is less than or equal to three seconds, the video clip of the target video cannot be generated, and the user terminal needs to long-press the record key for more than three seconds. Alternatively, the recording progress bar is controlled to be displayed in orange, which indicates that the video clip of the target video cannot be generated when the recording duration is excessively short.

Step S602: Output second prompt information and/or control the progress bar of the recording progress to be displayed in a second preset color if it is determined that the recording duration is greater than the preset recording duration.

After it is determined whether the recording duration is less than or equal to the preset recording duration, if it is determined that the recording duration is greater than the preset recording duration, the second prompt information is output, where the second prompt information is operation information for prompting to end generating the video clip, and/or the progress bar of the recording progress is controlled to be displayed in the second preset color. For example, when the preset duration is three seconds, if it is determined that the recording duration is greater than three seconds, the video recording page displays the second prompt information as "release at any time," which indicates that when the recording duration is greater than three seconds, the video clip of the target video can be generated, and the user terminal may release touching on the record key at any time. Alternatively, the recording progress bar is controlled to be displayed in green, which indicates that the recording duration is long enough to generate the video clip of the target video. Optionally, when the target video enters the recording mode, the record key becomes orange, and wave animation exists around the record key, to prompt the user terminal that the target video enters the recording mode. In the recording pause mode, the record key is still orange, and wave animation still exists around the record key, to prompt the user terminal that recording of the target video may continue, to prompt the user terminal to long-press the record key, thereby improving performance experience of the user terminal on recording of the target video.

Optionally, when the target video is in the recording pause mode, when the video recording page receives the recording instruction signal again, the recording progress bar starts to refresh, following the recording progress when recording is paused. Other states of the recording page are the same as states in the recording mode.

In this example embodiment of this application, after it is determined whether the recording duration is less than or equal to the preset recording duration, the first prompt information is output and/or the progress bar of the recording progress is controlled to be displayed in the first preset color if it is determined that the recording duration is less than or equal to the preset recording duration; the second prompt information is output and/or the progress bar of the recording progress is controlled to be displayed in the second preset color if it is determined that the recording duration is greater than the preset recording duration, achieving a technical effect of recording an online video and improving performance experience of the user terminal on recording of the target video.

In another optional implementation, the video recording page includes a first playback page, the first playback page is a page for displaying the target video, and the video clip preview mode is entered if it is determined that the recording duration is greater than the preset recording duration, as detailed with respect to FIG. 7 below.

Figure 7:
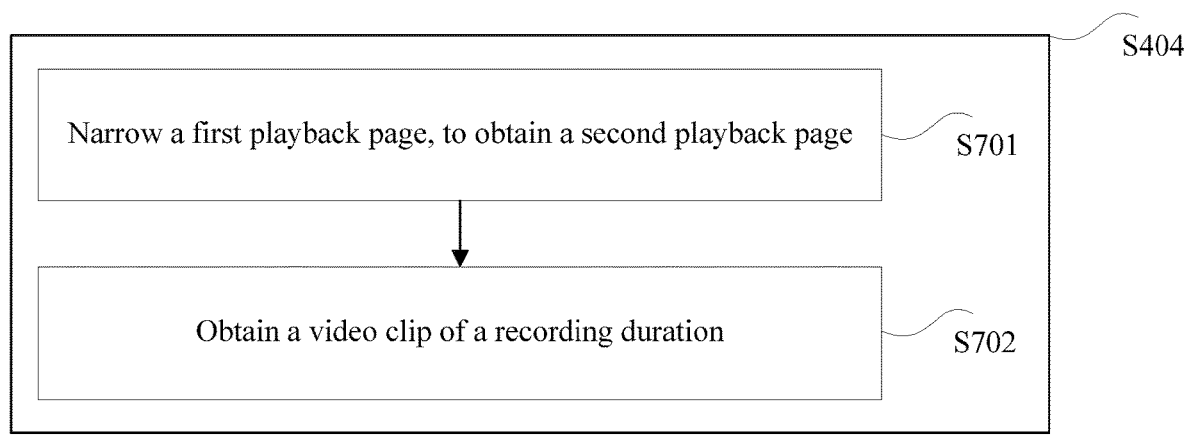
FIG. 7 is a flowchart of a method for entering a video clip preview mode according to the first example embodiment of this application.

FIG. 7 is a flowchart of a method for entering a video clip preview mode according to the first example embodiment of this application. As shown in FIG. 7, the method for entering a video clip preview mode (e.g., step S404 of FIG. 4) includes the following steps:

Step S701: Narrow the first playback page, to obtain a second playback page.

The video recording page includes the first playback page, and the first playback page may display the target video. The target video may play the target video in a form of a player. The video recording page further includes the second playback page. After the recording duration is greater than the preset recording duration, the video clip preview mode in which the target video is previewed is entered, the first playback page is narrowed to obtain the second playback page, and margins exist around the second playback page.

Step S702: Obtain a video clip of the recording duration.

The recorded video is generated according to the video clip of the recording duration, and the recorded video is displayed by using the second playback page.

The video clip of the recording duration is obtained in a process of receiving the recording instruction signal by using the video recording page. The recorded video generated according to the video clip of the target video of the recording duration is played by using the second playback page. Optionally, the recorded video is circularly played on the second playback page.

In this example embodiment of this application, the first playback page is narrowed to obtain the second playback page, the video clip of the recording duration is obtained, and the recorded video is displayed by using the second playback page, to enter the video clip preview mode when it is determined that the recording duration is greater than the preset recording duration, thereby improving performance experience of the user terminal on recording of the target video.

Figure 8:
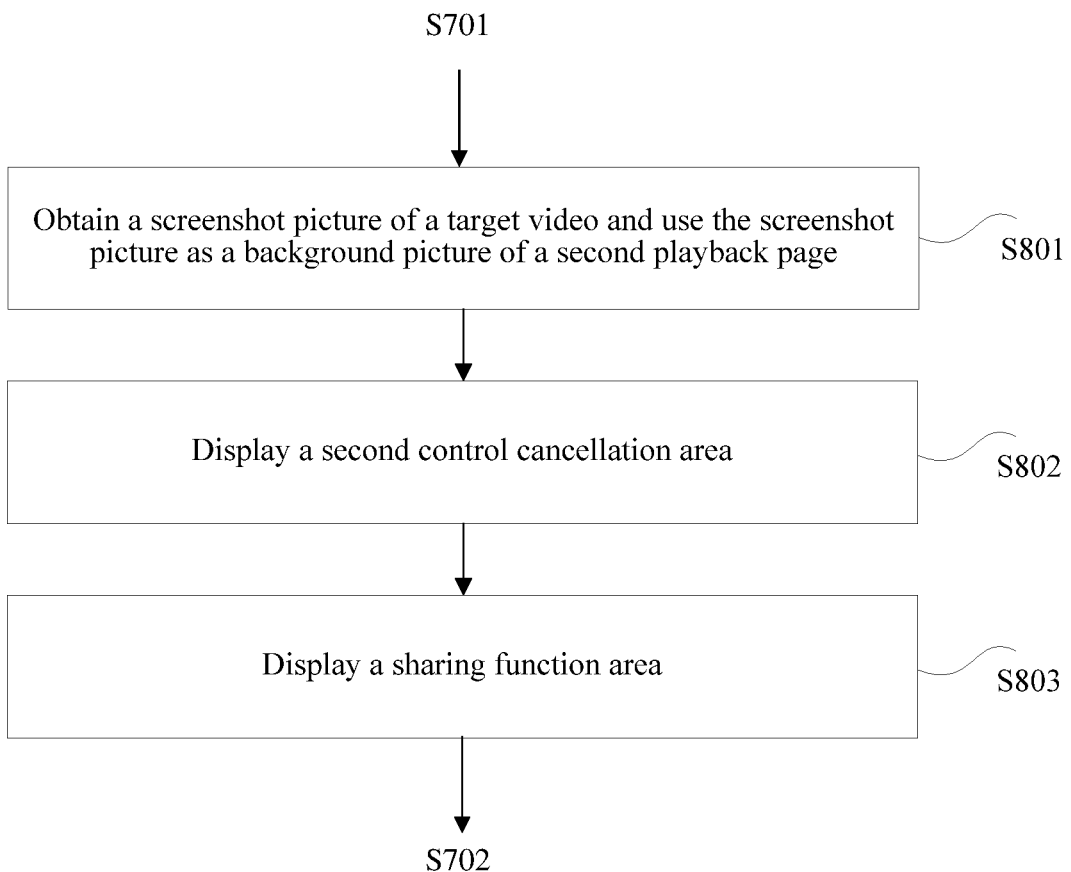
FIG. 8 is a flowchart of a method for entering a video clip preview mode according to the second example embodiment of this application.

FIG. 8 is a flowchart of a method for entering a video clip preview mode according to the second example embodiment of this application. As shown in FIG. 8, after the narrowing the first playback page, to obtain a second playback page, in step S701 of FIG. 7, the method for entering a video clip preview mode (e.g., step S404 of FIG. 4) further includes the following steps:

Step S801: Obtain a screenshot picture of the target video and use the screenshot picture as a background picture of the second playback page.

After the first playback page is narrowed to obtain the second playback page, the screenshot picture of the target video is obtained. Optionally, the screenshot picture of the target video is a screenshot picture obtained by taking any screenshot of content of the target video already played, and the screenshot picture is used as the background picture of the second playback page.

Step S802: Display a second control cancellation area.

The second control cancellation area is displayed on the second playback page, where display of the recorded video is canceled when a second instruction cancellation signal is received by using the second control cancellation area, the second playback page is restored to the first playback page, and the first playback page continues displaying the target video. The user terminal may continue watching the target video. Optionally, the second control cancellation area is displayed in a form of a cancellation key on the second playback page, and the cancellation key of the second playback page cancels display of the recorded video after receiving a touch signal from the user terminal.

Step S803: Display a sharing function area.

After the recorded video of the target video is generated according to the video clip, the user terminal may share the recorded video. The sharing function area is displayed on the second playback page. When a sharing instruction signal is received by using the sharing function area, the recorded video is shared to a social platform corresponding to the sharing function area. For example, the sharing function area is an icon of Media Hub, Sina microblog, Tencent microblog, Qzone, or Wechat Moments, the recorded video is shared to a social platform such as Media Hub, Sina microblog, Tencent microblog, Qzone, or Wechat Moments. Optionally, the sharing function area also displays sharing prompt information, for example, prompt information "recording is completed; share this small video to:."

In this example embodiment of this application, after the first playback page is narrowed to obtain the second playback page, the screenshot picture of the target video is obtained, and the screenshot picture is used as the background picture of the second playback page; the second control cancellation area is displayed, where display of the recorded video is canceled when the second instruction cancellation signal is received by using the second control cancellation area, the second playback page is restored to the first playback page, and the first playback page continues displaying the target video; the sharing function area is displayed, where the recorded video is shared to the social platform corresponding to the sharing function area when the sharing instruction signal is received by using the sharing function area, to enter the video clip preview mode.

After step S803 is performed, the method may continue in step S702 of FIG. 7.

Figure 9:
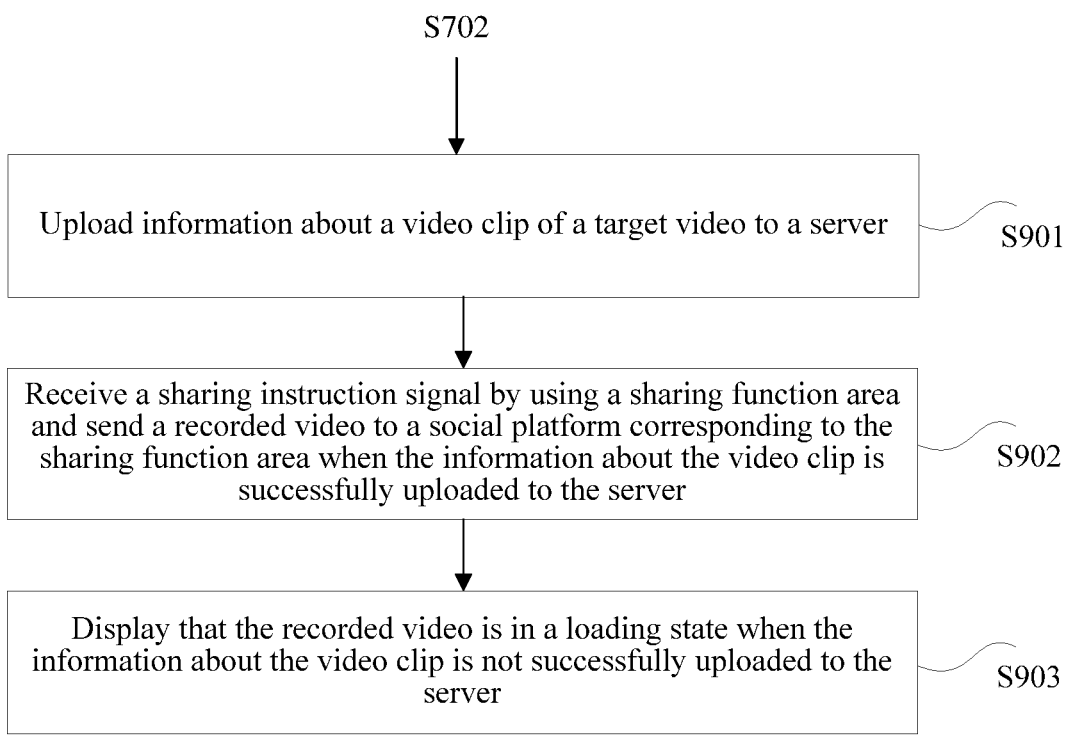
FIG. 9 is a flowchart of a method for entering a video clip preview mode according to a third example embodiment of this application.

FIG. 9 is a flowchart of a method for entering a video clip preview mode according to a third example embodiment of this application. As shown in FIG. 9, after the entering a video clip preview mode if it is determined that the recording duration is greater than the preset recording duration, in step S402 of FIG. 4, the method for entering a video clip preview mode (e.g., step S404 of FIG. 4) further includes the following steps:

Step S901: Upload information about the video clip of the target video to a server.

Step S901 may be performed after step S702 of FIG. 7.

In a process that the user terminal previews the recorded video, the mobile terminal uploads the information about the video clip of the target video to the server, that is, the information about the video clip of the target video is uploaded to a background server. The server generates information about a recorded video composed of the video clip and sends the information about the recorded video to the mobile terminal when the information about the video clip of the target video is successfully uploaded to the server. The information about the recorded video may be information such as an ID of a video, a title of a video, and a video service, to indicate that the video clip of the target video is successfully uploaded to the server.

Step S902: Receive the sharing instruction signal by using the sharing function area and send the recorded video to the social platform corresponding to the sharing function area when the information about the video clip is successfully uploaded to the server.

In the second playback page, the user terminal touches a sharing function area and generates a sharing instruction signal. The sharing function area receives the sharing instruction signal and sends the recorded video to a social platform corresponding to the sharing function area.

Step S903: Display that the recorded video is in a loading state when the information about the video clip is not successfully uploaded to the server.

When the video clip is not successfully uploaded to the server, the second playback page displays that the recorded video is in the loading state, for example, a dynamic sign of a rotating chrysanthemum, to prompt the user terminal that the video clip is not successfully uploaded to the server and cannot be shared to the social platform, and a status sign of the rotating chrysanthemum disappears until the video clip is successfully uploaded to the server.

In this example embodiment of this application, after the video clip preview mode is entered if it is determined that the recording duration is greater than the preset recording duration, the information about the video clip of the target video is uploaded to the server. The server generates information about the recorded video composed of the video clip and sends the information about the recorded video to the mobile terminal when the information about the video clip of the target video is successfully uploaded to the server; the sharing instruction signal is received by using the sharing function area, and the recorded video is sent to the social platform corresponding to the sharing function area when the information about the video clip is successfully uploaded to the server; it is displayed that the recorded video is in the loading state when the information about the video clip is not successfully uploaded to the server, to enter the video clip preview mode.

Figure 10:
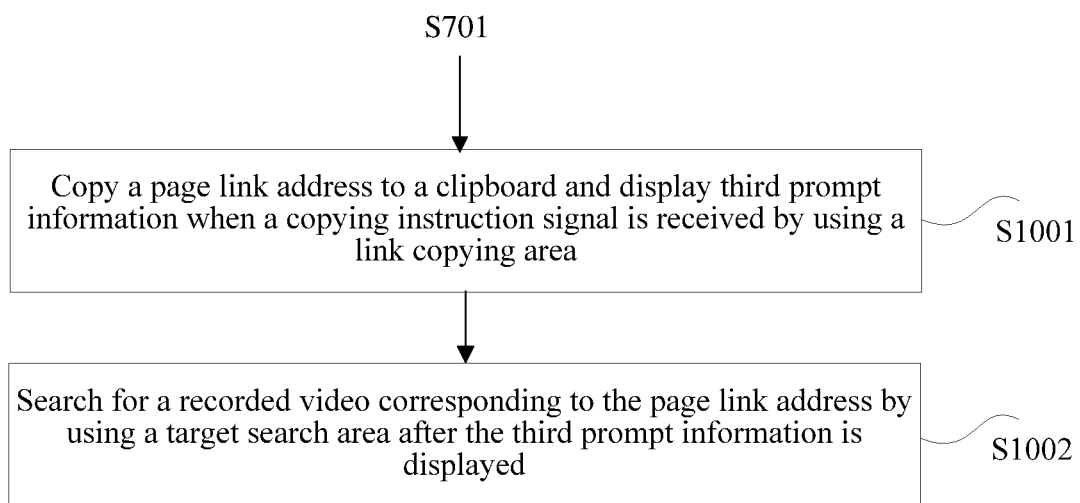
FIG. 10 is a flowchart of a method for entering a video clip preview mode according to a fourth example embodiment of this application.

FIG. 10 is a flowchart of a method for entering a video clip preview mode according to a fourth example embodiment of this application. As shown in FIG. 10, the sharing function area includes a link copying area, used for obtaining a page link address of the recorded video, and after the narrowing the first playback page, to obtain a second playback page, in step S701 of FIG. 7, the method for entering a video clip preview mode (step S404 of FIG. 4) further includes the following steps:

Step S1001: Copy the page link address to a clipboard and display third prompt information when a copying instruction signal is received by using the link copying area.

The second playback page further includes the link copying area. After the first playback page is narrowed to obtain the second playback page, when the copying instruction signal is received by using the link copying area, the page link address is copied to the clipboard, and the third prompt information is displayed, where the third prompt information is information for prompting successful copying of the page link address. Optionally, the link copying area is displayed on the second playback page in a form of a link copying key. The user terminal taps on the link copying key and generates the copying instruction signal. When the copying instruction signal is received by using the link copying key, the page link address is copied to the clipboard, that is, a link address of an H5 (HTML5) page of the video clip is copied to the clipboard, and the third prompt information, such as "this link is successfully copied," is displayed, to prompt the user terminal that the link is successfully copied. The link address of the H5 page is pasted to the clipboard.

Step S1002: Search for a recorded video corresponding to the page link address by using a target search area after the third prompt information is displayed.

The recorded video corresponding to the page link address is searched for by using the target search area after the third prompt information is displayed. The user terminal may paste the page link address in the clipboard to the target search area. The target search area is used for searching for the recorded video corresponding to the page address.

In this example embodiment of this application, after the first playback page is narrowed to obtain the second playback page, the page link address is copied to the clipboard, and the third prompt information is displayed when the copying instruction signal is received by using the link copying area; the recorded video corresponding to the page link address is searched for by using the target search area after the third prompt information is displayed, to enter the video clip preview mode, thereby improving performance experience of the user terminal on recording of an online video.

Figure 11:
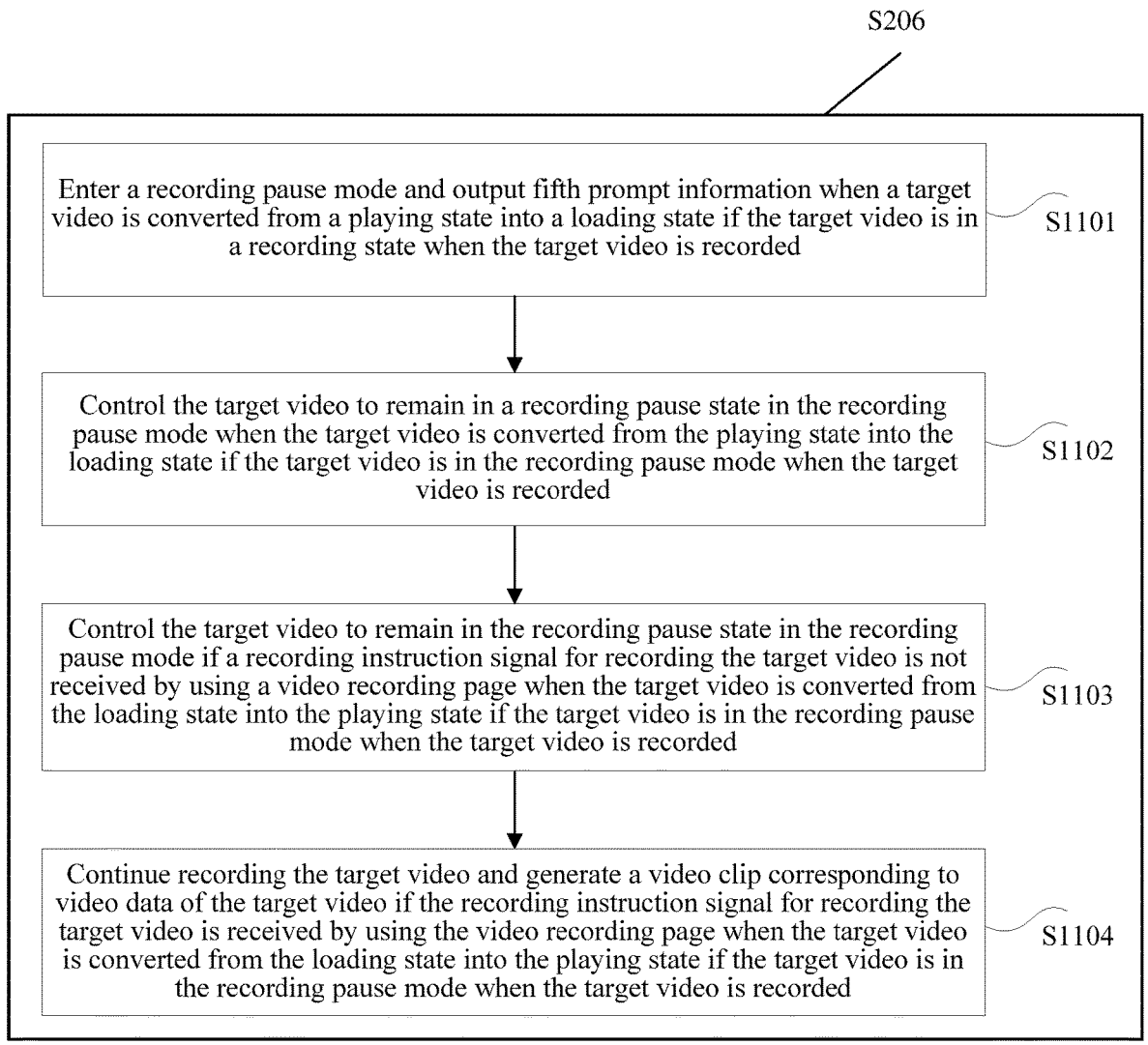
FIG. 11 is a flowchart of a method for entering a recording mode in response to a recording instruction signal according to the third example embodiment of this application.

FIG. 11 is a flowchart of a method for entering a recording mode in response to a recording instruction signal according to the third example embodiment of this application. As shown in FIG. 11, a process of the method for entering a recording mode in response to a recording instruction signal (e.g., step S206 of FIG. 2) includes the following steps:

Step S1101: Enter the recording pause mode and output fifth prompt information when the target video is converted from a playing state into the loading state if the target video is in a recording state when the target video is recorded.

States of a video in a playing process include the playing state, the loading state, and a playing stopping state. After the recording mode is entered, before recording of the target video starts, because a network status is poor, the target video may be in the loading state, that is, the target video may be in a buffering state, and fourth prompt information is output, where the fourth prompt information is information for prompting that the target video is in the loading state and cannot enter the recording mode. For example, the fourth prompt information is "buffering, please wait." The recording pause mode is entered and the fifth prompt information is output when the target video is converted from the playing state into the loading state if the target video is in the recording state when recording of the target video starts. The fifth prompt information is information for prompting that a network of the target video is unstable. For example, the fifth prompt information is "your network is unstable, continue recording later."

Step S1102: Control the target video to remain in a recording pause state in the recording pause mode when the target video is converted from the playing state into the loading state if the target video is in the recording pause mode when the target video is recorded.

When the target video is recorded, if the target video is in the recording pause mode, because the network status may get worse, the target video is made to be converted from the playing state into the loading state. When the target video is converted from the playing state into the loading state, the target video is controlled to still remain in the recording pause state in the recording pause mode, and no other processing is performed.

Step S1103: Control the target video to remain in the recording pause state in the recording pause mode if the recording instruction signal for recording the target video is not received by using the video recording page when the target video is converted from the loading state into the playing state if the target video is in the recording pause mode when the target video is recorded.

When the target video is recorded, if the target video is in the recording pause mode, because the network status may get better, the target video is made to be converted from the loading state into the playing state. When the target video is converted from the loading state into the playing state, if the recording instruction signal for recording the target video is not received by using the video recording page, the target video is controlled to still remain in the recording pause state in the recording pause mode. For example, if a finger of the user terminal has left the record key, the target video is controlled to still remain in the recording pause state in the recording pause mode, and no other processing is performed.

Step S1104: Continue recording the target video and generate the video clip corresponding to the video data of the target video if the recording instruction signal for recording the target video is received by using the video recording page when the target video is converted from the loading state into the playing state if the target video is in the recording pause mode when the target video is recorded.

When the target video is recorded, if the target video is in the recording pause mode, because the network status may get better, the target video is converted from the loading state into the playing state. When the target video is converted from the loading state into the playing state, if the recording instruction signal for recording the target video is received by using the video recording page, recording of the target video continues, and the video clip corresponding to the video data of the target video is generated. For example, if the finger of the user terminal does not leave the record key, when the target video is converted from the loading state into the playing state, recording of the target video automatically continues.

In this example embodiment of this application, after the recording instruction signal for recording the target video is received by using the video recording page, the fourth prompt information is output if the target video is in the loading state before recording of the target video starts; when the target video is recorded, the recording pause mode is entered and the fifth prompt information is output when the target video is converted from the playing state into the loading state if the target video is in the recording state, and the target video is controlled to remain in the recording pause state in the recording pause mode when the target video is converted from the playing state into the loading state; when the target video is recorded, if the target video is in the recording pause mode, when the target video is converted from the loading state into the playing state, the target video is controlled to remain in the recording pause state in the recording pause mode if the recording instruction signal for recording the target video is not received by using the video recording page, and recording of the target video continues and the video clip corresponding to the video data of the target video is generated if the recording instruction signal for recording the target video is received by using the video recording page, to obtain the video clip corresponding to the video data of the target video, thereby achieving a technical effect of recording an online video.

Figure 12:
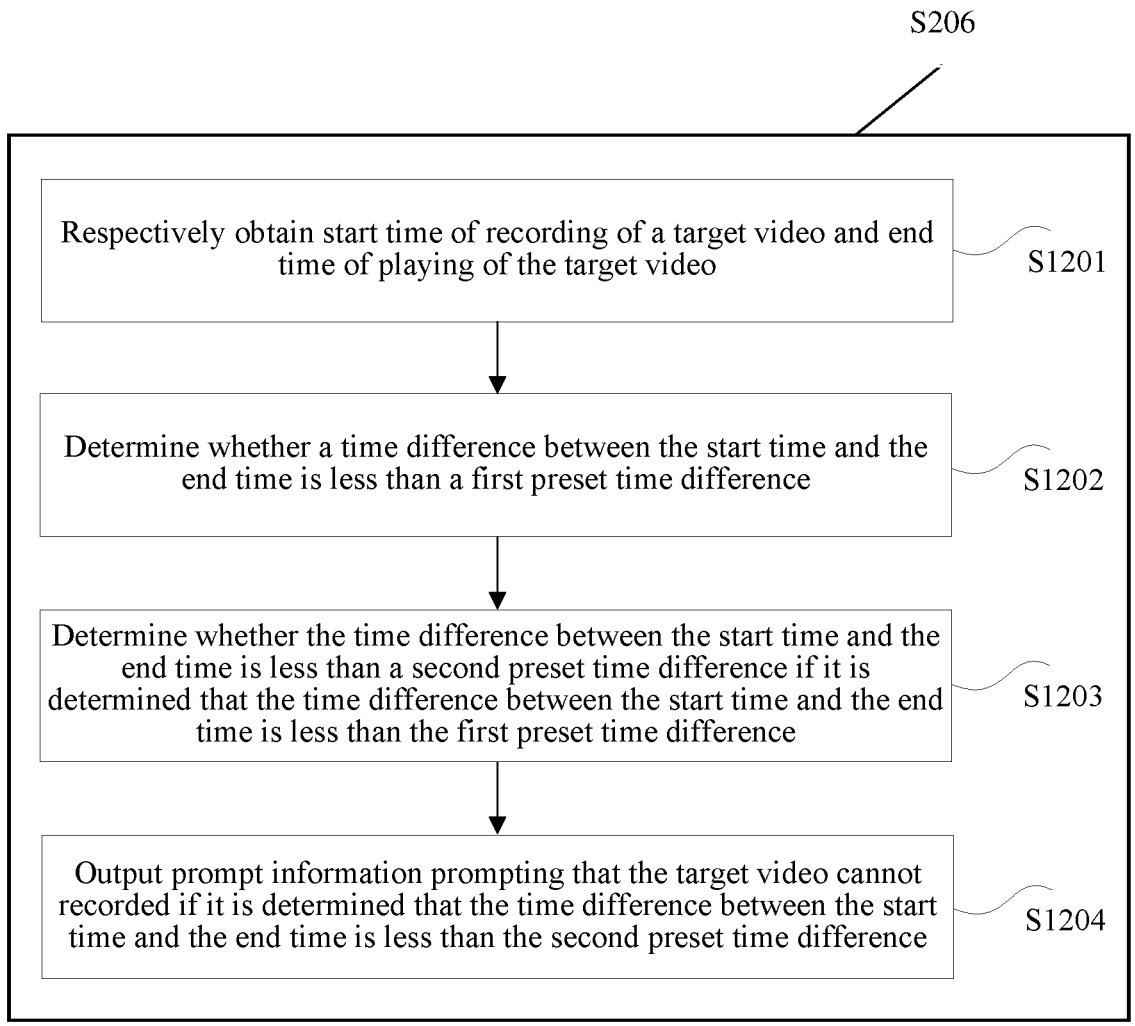
FIG. 12 is a flowchart of a method for entering a recording mode in response to a recording instruction signal according to the fourth example embodiment of this application.

FIG. 12 is a flowchart of a method for entering a recording mode in response to a recording instruction signal according to the fourth example embodiment of this application. As shown in FIG. 12, a process of the method for entering a recording mode in response to a recording instruction signal (e.g., step S206 of FIG. 2) includes the following steps:

Step S1201: Respectively obtain start time of recording of the target video and end time of playing of the target video.

After the recording instruction signal for recording the target video is received by using the video recording page, the start time of recording of the target video and the end time of playing of the target video are respectively obtained.

Step S1202: Determine whether a time difference between the start time and the end time is less than a first preset time difference.

After the start time of recording of the target video and the end time of playing of the target video are respectively obtained, the time difference between the start time and the end time is calculated, and whether the time difference between the start time and the end time is less than the first preset time difference is determined. For example, the first preset time difference is eight seconds.

Step S1203: Determine whether the time difference between the start time and the end time is less than a second preset time difference if it is determined that the time difference between the start time and the end time is less than the first preset time difference.

Whether the time difference between the start time and the end time is less than the second preset time difference is determined if it is determined that the time difference between the start time and the end time is less than the first preset time difference. The second preset time difference may be minimum time in which the video clip is generated. For example, the second preset time difference is three seconds.

Step S1204: Output prompt information prompting that the target video cannot be recorded if it is determined that the time difference between the start time and the end time is less than the second preset time difference.

The prompt information prompting that the target video cannot be recorded is output if it is determined that the time difference between the start time and the end time is less than the second preset time difference. For example, prompt information "playing of the video is about to end, so the video cannot be recorded" is output.

Step S1205: Enter the recording mode in response to the recording instruction signal and end recording of the target video before playing of the target video ends if it is determined that the time difference between the start time and the end time is greater than or equal to the second preset time difference.

If it is determined that the time difference between the start time and the end time is greater than or equal to the second preset time difference, the target video may be recorded, the recording mode is entered in response to the recording instruction signal, and recording of the target video is ended before playing of the target video ends. Optionally, the video recording page monitors a video playing end event, and when playing of the target video ends, generates the video clip corresponding to the video data of the target video, to automatically enter the video clip preview mode, to preview the video clip.

In this example embodiment of this application, the start time of recording of the target video and the end time of playing of the target video are respectively obtained; whether the time difference between the start time and the end time is less than the first preset time difference is determined; whether the time difference between the start time and the end time is less than the second preset time difference is determined if it is determined that the time difference between the start time and the end time is less than the first preset time difference; the prompt information prompting that the target video cannot be recorded is output if it is determined that the time difference between the start time and the end time is less than the second preset time difference; the recording mode is entered in response to the recording instruction signal and recording of the target video ends before playing of the target video ends if it is determined that the time difference between the start time and the end time is greater than or equal to the second preset time difference, to obtain the video clip corresponding to the video data of the target video, thereby achieving a technical effect of recording an online video.

The technical solutions of this application are described below with reference to the example embodiments.

Figure 13:
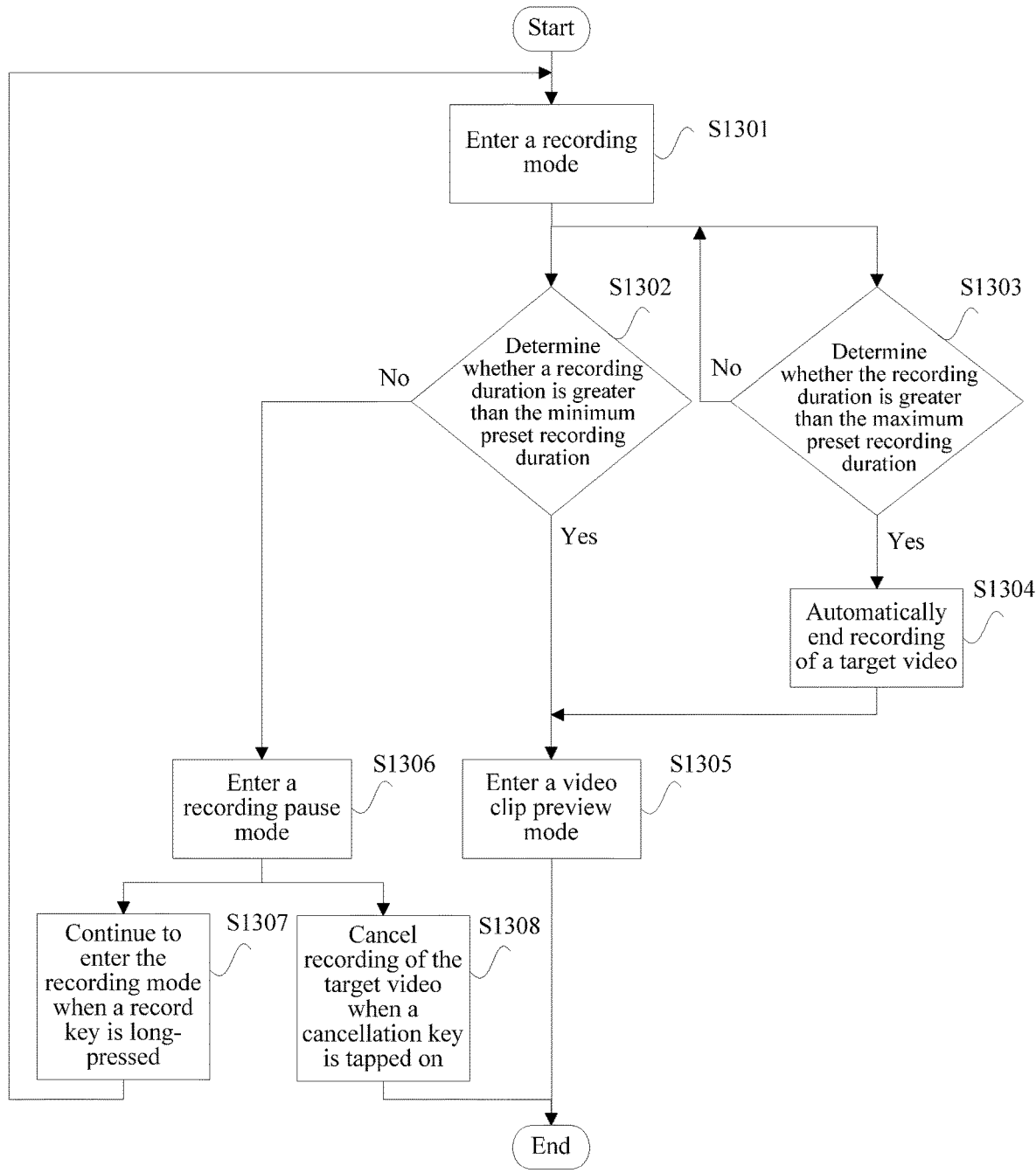
FIG. 13 is a flowchart of a video recording method of a mobile terminal according to the third example embodiment of this application.

FIG. 13 is a flowchart of a video recording method of a mobile terminal according to the third example embodiment of this application. As shown in FIG. 13, the video recording method of a mobile terminal includes the following steps:

Step S1301: Enter the recording mode.

The user terminal generates the recording instruction signal on the video recording page by long-pressing the record key. The video recording page enters the recording mode by using the recording instruction signal. The first playback page is a full-screen player of the mobile terminal, and the record key for recording a video may be provided on the full-screen player. The user terminal long-presses the record key on the full-screen player, and the mobile terminal generates a prompt ring and vibrates, to prompt a user to start to enter the recording mode. In the recording mode, a control bar of the full-screen player disappears, that is, the user terminal cannot perform a playing operation on the target video, prompt messages prompting the recording progress bar and the recording duration appear at the top of the full-screen player, and the recording progress may diffuse from the middle to two ends. The user terminal may more intuitively feel a period of time for which a recorded video of the target video has been recorded by using the recording progress bar. In a process of recording the target video, when the recording duration is not greater than the minimum recording duration, for example, when the recording duration is less than or equal to three seconds, the recording progress bar is displayed in orange, and the first prompt information "long-press for more than three seconds" is output, to prompt the user that the recording duration for which the target video is recorded is too short to generate the video clip. When the recording duration is greater than the minimum recording duration, the recording progress bar is displayed in green, a duration for which the target video is recorded is output, and the prompt information "release at any time" is output, to prompt the user terminal that recording of the target video may be stopped, and the video clip is generated. In the recording mode, the record key becomes orange, and wave animation exists around the record key, to prompt the user that the video is in the recording state.

Step S1302: Determine whether the recording duration is greater than the minimum preset recording duration.

The preset recording duration includes the minimum recording duration and the maximum recording duration. In a recording process of recording the target video, whether the recording duration is greater than the minimum preset recording duration is determined. When the recording duration is not greater than the minimum recording duration, for example, when the recording duration is less than or equal to three seconds, step S1306 is performed. When the recording duration is greater than the minimum recording duration, step S1305 is performed.

Step S1303: Determine whether the recording duration is greater than the maximum preset recording duration.

After the recording mode is entered, in a process of recording the target video, whether the recording duration is greater than the maximum preset recording duration is determined. If it is determined that the recording duration is greater than the maximum preset recording duration, step S1304 is performed. If it is determined that the recording duration is not greater than the maximum preset recording duration, whether the recording duration is greater than the maximum preset recording duration continues to be determined.

Step S1304: Automatically end recording of the target video.

When the user terminal long-presses the record key and generates a recording signal, and the recording duration of the target video is greater than the maximum preset recording duration, for example, the maximum preset recording duration is eight seconds, recording of the target video automatically ends.

Step S1305: Enter the video clip preview mode.

When the user terminal long-presses the record key and generates a recording signal, and the recording duration of the target video is greater than the minimum preset recording duration, for example, the minimum preset recording duration is three seconds, the video clip preview mode is entered. When the user long-presses the record key and generates a recording signal, and the recording duration of the target video is greater than the maximum preset recording duration, for example, the maximum preset recording duration is eight seconds, the video recording process automatically ends, and the video clip preview mode is entered.

In the video clip preview mode, the full-screen player becomes smaller, margins exist around the player, and a video clip recorded just now is circularly played in the narrowed player. A whole screen uses a semitransparent video screenshot as a background. The cancellation key is provided on a screen of the mobile terminal, the user terminal taps on the cancellation key to cancel a video recorded just now, and the player becomes larger and returns to full-screen play, so that the user terminal continues watching the target video.

In a process of previewing the video clip by the user terminal, the mobile terminal uploads the information about the video clip to a background server, and the background server returns information related to the generated video clip to the mobile terminal, to indicate that the video clip is successfully uploaded to the background server. Entries of sharing to other social platforms and the link copying key are provided at the bottom of the screen of the mobile terminal. The user terminal taps on a sharing entry. If the information about the video clip is successfully uploaded to the server, the user terminal may share the video clip to a corresponding social platform. If the video clip is not successfully uploaded to the server, the entry of the social platform shows the loading state, for example, shows a state of a rotating chrysanthemum. When the video clip is successfully uploaded to the server, the corresponding social platform is pulled up to share the recorded video generated by the video clip. If the user terminal taps on the link copying key, a link of the H5 page corresponding to the video clip is copied to the clipboard, and the user terminal is prompted that the link of the H5 page corresponding to the video clip is successfully copied, and the recorded video corresponding to a link of the H5 page is searched for by using the target search area.

Step S1306: Enter the recording pause mode.

When it is determined that the recording duration is less than or equal to the minimum preset recording duration, the recording pause mode is entered. In the recording pause mode, playing of a video is paused, the recording progress bar holds still, and prompt information "less than three seconds, continue long-pressing the record key" appears at the top of the player, to prompt the user terminal that the record key needs to be long-pressed until the recording duration is greater than three seconds, to complete recording of the video clip. The record key is still orange, and wave animation exists around the record key, to prompt the user to long-press the record key. There is a "cancel" key at a top left corner of the full-screen player, the user taps on the key to cancel video recording, and the video recovers to the unrecorded state of the target video. When the user terminal long-presses the record key again, the target video is recorded again. The recording progress bar starts to refresh, following the progress when recording is paused, and other states are the same as those in the recording mode.

Step S1307: Continue to enter the recording mode when the record key is long-pressed.

After the recording pause mode is entered, the user terminal long-presses the record key and continues generating the recording instruction signal on the video recording page. The mobile terminal continues to enter the recording mode. Step S1301 is performed.

Step S1308: Cancel recording of the target video when the cancellation key is tapped on.

After the recording pause mode is entered, the user terminal taps on the cancellation key to cancel recording of the target video.

In this example embodiment of this application, the recording mode is entered; whether the recording duration is greater than the minimum preset recording duration is determined, and whether the recording duration is greater than the maximum preset recording duration is determined; when the recording duration is greater than the maximum preset recording duration, recording of the target video automatically ends, and the video clip preview mode is entered; when it is determined that the recording duration is greater than the minimum preset recording duration, the video clip preview mode is entered; when it is determined that the recording duration is less than or equal to the minimum preset recording duration, the recording pause mode is entered; the recording mode continues to be entered when the record key is long-pressed; recording of the target video is canceled when the cancellation key is tapped on, thereby achieving a technical effect of recording an online video and improving performance experience of the user terminal on recording of the online video.

Figure 14:
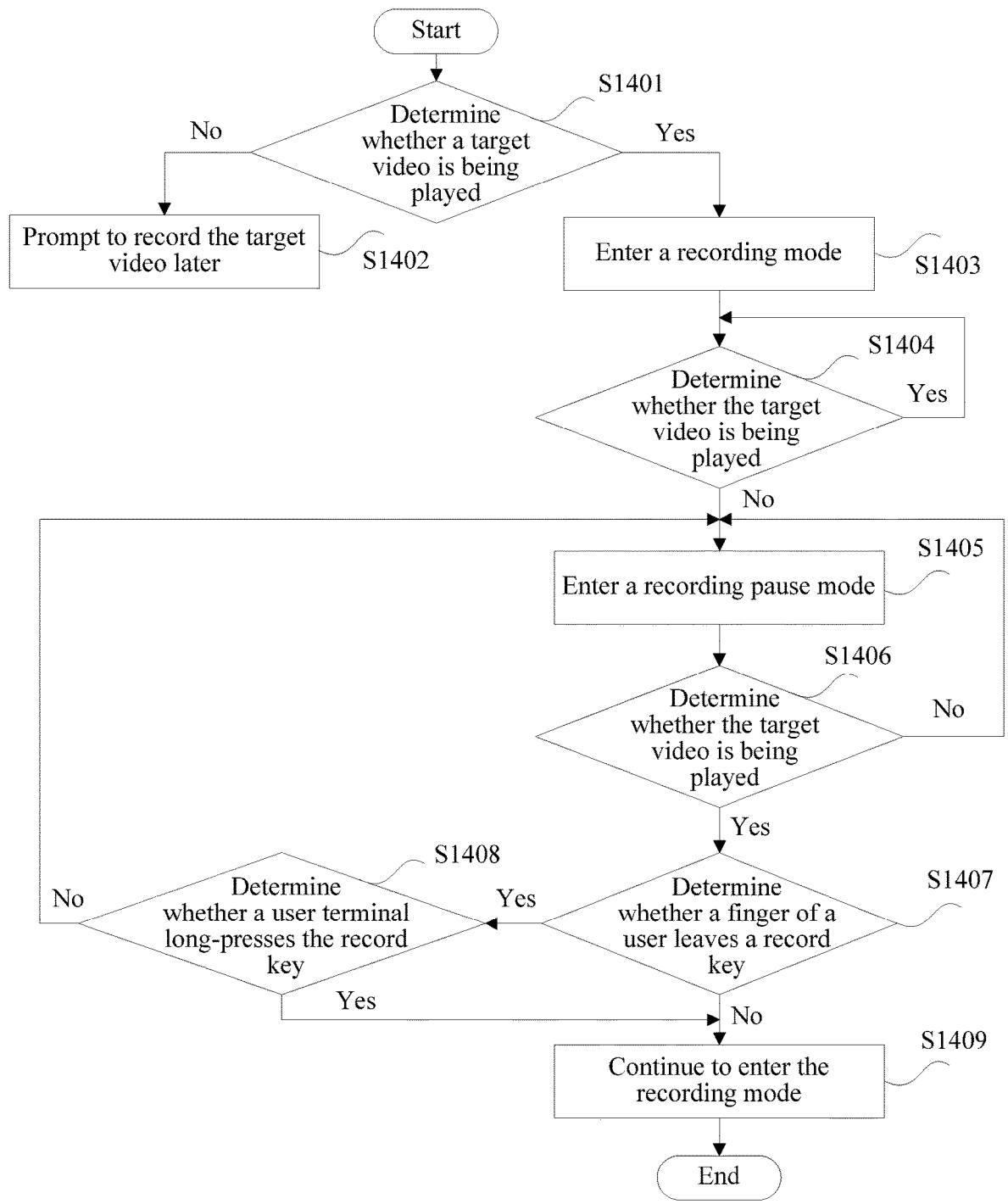
FIG. 14 is a flowchart of a video recording method of a mobile terminal according to the fourth example embodiment of this application.

FIG. 14 is a flowchart of a video recording method of a mobile terminal according to the fourth example embodiment of this application. As shown in FIG. 14, the video recording method of a mobile terminal includes the following steps:

Step S1401: Determine whether the target video is being played.

When a network status of the mobile terminal is poor, the target video may be played sometimes and may be in the loading (buffering) state sometimes. The user terminal determines whether the target video is being played after generating the recording instruction signal by long-pressing the record key. If it is determined that the target video is not being played, step S1402 is performed. If it is determined that the target video is being played, step S1403 is performed.

Step S1402: Prompt to record the target video later.

When the network status is poor, the target video may be in the loading state, and the target video stops being played. If it is determined that the target video is not played, the target video cannot be recorded, and it is prompted to record the target video later. For example, prompt information prompting the user terminal "buffering, please wait" is output, and the recording mode cannot be entered.

Step S1403: Enter the recording mode.

If the target video is being played, the recording mode is entered to record the target video.

Step S1404: Determine whether the target video is being played.

After the recording mode is entered, when video recording starts, and the video is in the recording state, whether the target video is being played is determined. If it is determined that the target video is being played, the target video continues remaining in the recording mode, and along with changes of the network status, whether the target video is being played is determined. When the target video is converted from the playing state into the buffering state, it is determined that the target video is not being played. Step S1405 is performed.

Step S1405: Enter the recording pause mode.

When the target video is converted from the playing state into the buffering state, it is determined that the target video is not being played. In this case, the recording pause mode is entered, and the user terminal is prompted with "your network is unstable, continue recording later."

Step S1406: Determine whether the target video is being played.

When video recording already starts, and the target video is in the recording pause state in the recording pause mode, whether the target video is being played is determined. When the target video is converted from the playing state into the buffering state, the target video still remains in the recording pause state, and on other processing is performed. When the target video is converted from the buffering state into the playing state, step S1407 is performed.

Step S1407: Determine whether a finger of the user leaves the record key.

When video recording already starts, and the target video is in the recording pause state in the recording pause mode, when the target video is converted from the buffering state into the playing state, playing of the target video starts. In this case, whether the finger of the user leaves the record key is determined. If the finger of the user has left the record key, the target video still remains in the recording pause state, and no other processing is performed. If it is determined that the finger of the user does not leave the record key, step S1409 is performed.

Step S1408: Determine whether the user terminal long-presses the record key.

If the finger of the user has left the record key, whether the finger of the user long-presses the record key is determined. If it is determined that the finger of the user long-presses the record key, step S1409 is performed. If it is determined that the finger of the user does not long-press the record key, step S1405 is performed.

Step S1409: Continue to enter the recording mode.

In this example embodiment of this specification, before video recording starts, when the video is in the buffering (loading) state, the user long-presses the record key, and the user is prompted with "buffering, please wait" and not to enter the recording mode. When video recording already starts, and the video is in the recording state, the video is converted from the playing state into the buffering state, the recording pause mode is entered, and the user is prompted with "your network is unstable, continue recording later." When video recording already starts, and the video is in the recording pause state, the video is converted from the playing state into the buffering state, the video still remains in the recording pause state, and on other processing is performed. When video recording already starts, and the video is in the recording pause state, the video is converted from the buffering state into the playing state, if the finger of the user has left the record key, the video still remains in the recording pause state, and on other processing is performed. When video recording already starts, and the video is in the recording pause state, the video is converted from the buffering state into the playing state, if the finger of the user does not leave the record key, video recording automatically continues, thereby achieving a technical effect of recording an online video and improving performance experience of the user terminal on recording of the online video.

Figure 15:
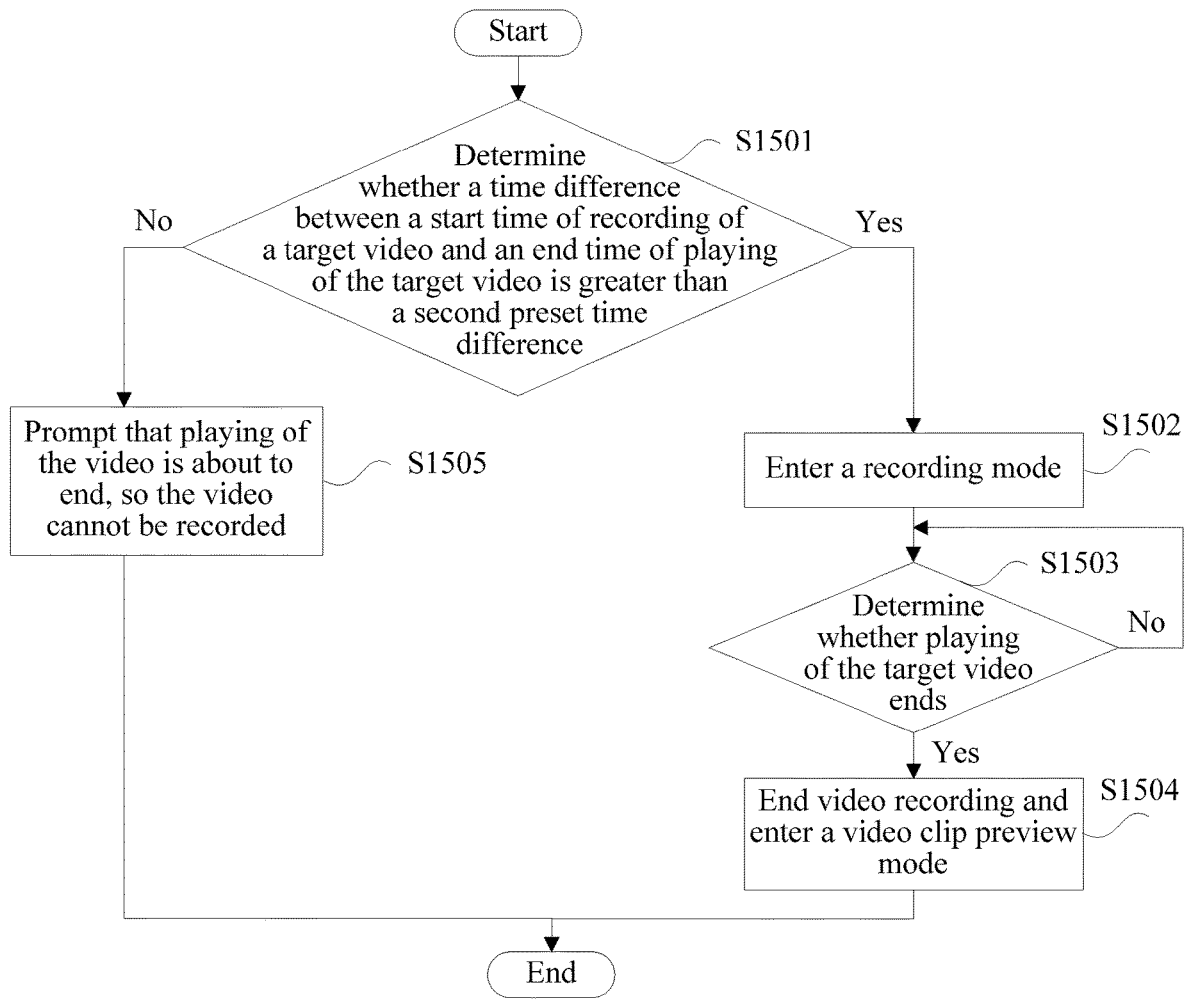
FIG. 15 is a flowchart of a video recording method of a mobile terminal according to a fifth example embodiment of this application.

FIG. 15 is a flowchart of a video recording method of a mobile terminal according to a fifth example embodiment of this application. As shown in FIG. 15, the video recording method of a mobile terminal includes the following steps:

Step S1501: Determine whether the time difference between the start time of recording of the target video and the end time of playing of the target video is greater than the second preset time difference.

The start time of recording of the target video and the end time of playing of the target video are respectively obtained, and whether the time difference between the start time and the end time is less than the first preset time difference is determined. For example, the first preset time difference is eight seconds. If it is determined that the time difference between the start time and the end time is less than the first preset time difference, whether the time difference between the start time and the end time is less than the second preset time difference is determined. For example, the second preset time difference is three seconds. If it is determined that the time difference between the start time and the end time is less than the second preset time difference, step S1505 is performed. If it is determined that the difference between a recording start time point and a playing end time point is greater than or equal to the second preset time difference, step S1502 is performed. That is, when a difference between a current playing time point and the playing end time point of the target video is less than eight seconds, whether the difference between the recording start time point and the playing end time point of the target video is less than three seconds is determined. If it is determined that the difference between the recording start time point and the playing end time point of the target video is less than three seconds, step S1505 is performed. If it is determined that the difference between the recording start time point and the playing end time point of the target video is greater than or equal to three seconds, step S1505 is performed.

Step S1502: Enter the recording mode.

The target video is recorded in the recording mode.

Step S1503: Determine whether playing of the target video ends.

After the recording mode is entered, whether playing of the target video ends is determined. If it is determined that playing of the target video ends, step S1504 is performed. If it is determined that playing of the target video does not end, continue remaining in the step.

Step S1504: End video recording and enter the video clip preview mode.

The video playing end event is monitored, and recording of the target video is completed before playing of the target video ends. When playing of the video ends, video recording automatically ends, and the video clip preview mode is entered.

Step S1505: Prompt that playing of the video is about to end, so the video cannot be recorded.

If it is determined that the time difference between the start time and the end time is less than the second preset time difference, it is prompted that playing of the video is about to end, so the video cannot be recorded.

In this example embodiment of this application, whether the time difference between the start time of recording of the target video and the end time of playing of the target video is greater than the second preset time difference is determined; if it is determined that the time difference between the start time of recording of the target video and the end time of playing of the target video is greater than the second preset time difference, the recording mode is entered. Whether playing of the target video ends is determined. If it is determined that playing of the target video ends, video recording ends, and the video clip preview mode is entered. If it is determined that the time difference between the start time of recording of the target video and the end time of playing of the target video is less than or equal to the second preset time difference, it is prompted that playing of the video is about to end, so the video cannot be recorded, thereby achieving a technical effect of recording an online video and improving performance experience of the user terminal on recording of the online video.

Figure 16:
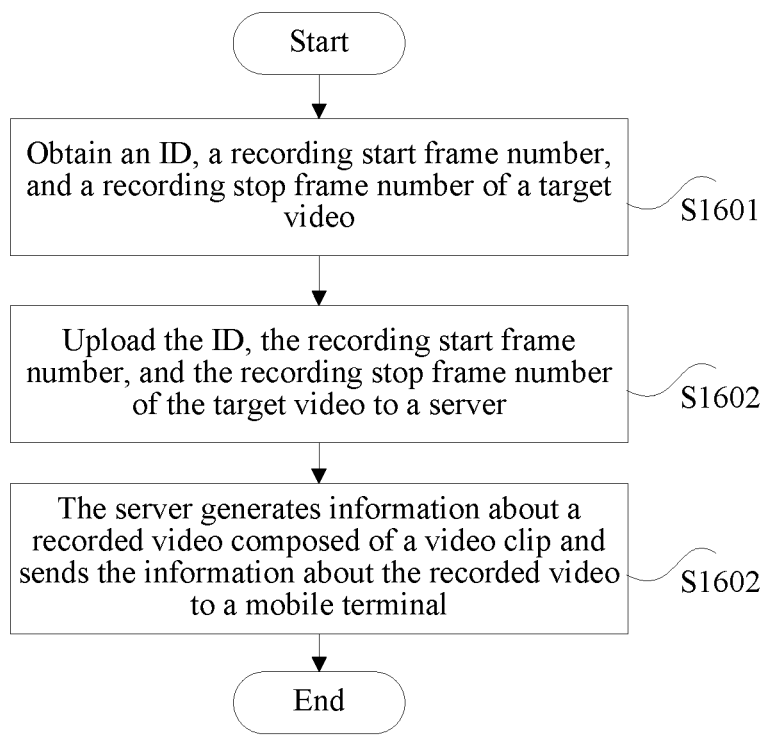
FIG. 16 is a flowchart of a video recording method of a mobile terminal according to a sixth example embodiment of this application.

FIG. 16 is a flowchart of a video recording method of a mobile terminal according to a sixth example embodiment of this application. As shown in FIG. 16, the video recording method of a mobile terminal includes the following steps:

Step S1601: Obtain an ID, a recording start frame number, and a recording stop frame number of a target video.

A video clip is recorded in the target video, and identification information of an effective ID, a video recording start frame number (FrameID1), and a video recording stop frame number (FrameID2) of a target video corresponding to the current video clip is recoded. The ID, the recording start frame number, and the recording stop frame number of the target video may uniquely determine content of a recorded video.

Step S1602: Upload the ID, the recording start frame number, and the recording stop frame number of the target video to a server.

After the ID, the recording start frame number, and the recording stop frame number of the target video are obtained, the ID, the recording start frame number, and the recording stop frame number of the target video are uploaded to the server.

Step S1604: The server generates information about a recorded video composed of a video clip and sends the information about the recorded video to a mobile terminal.

The server re-generates a corresponding small video clip on the server according to the ID, the recording start frame number, and the recording stop frame number of the target video. Optionally, the server may perform an operation such as encoding and decoding, on video information of the video, such as picture frames from the recording start frame number to the recording stop frame number and sounds, and re-generates a corresponding small video, so that the mobile terminal second-passes the recorded video clip played online to the server, and a real video transmission process does not need to be performed, thereby reducing time overheads and bandwidth overheads in a whole process of video recording and enhancing good experience of the user.

In this example embodiment of this application, the recorded video is not uploaded to the server, but the corresponding video is generated on the server by using information for generation of recording, thereby saving a bandwidth for uploading the recorded video and shortening a period of time of uploading the recorded video.

The video recording method of a mobile terminal in the example embodiments of this application may be used on a full-screen player, as shown in FIGS. 17-21 below.

Figure 17:
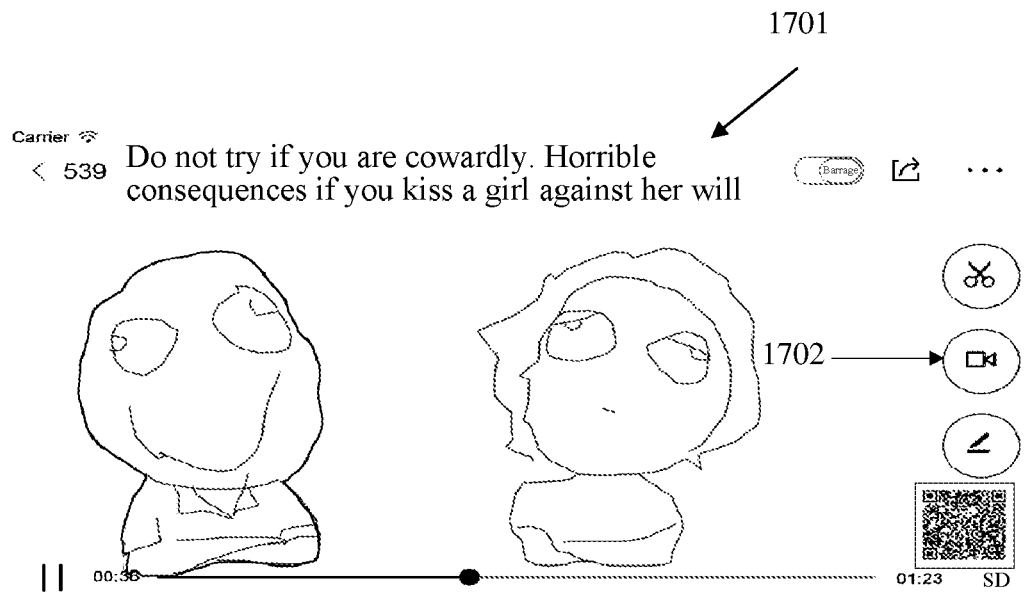
FIG. 17 is a schematic demonstration diagram of a record key of a full-screen player according to an example embodiment of this application.

FIG. 17 is a schematic demonstration diagram of a record key of a full-screen player according to an example embodiment of this application. As shown in FIG. 17, the solution may be applied to a Tencent video full-screen player, and a page first displayed on the full-screen player is a first playback page 1701. A record key 1702 is provided at the right side of the full-screen player and is an icon pointed by an arrow. A user long-presses the record key 1702 to enter a recording state. In this case, the record key 1702 becomes orange, and orange wave animation exists around the record key 1702.

Figure 18:
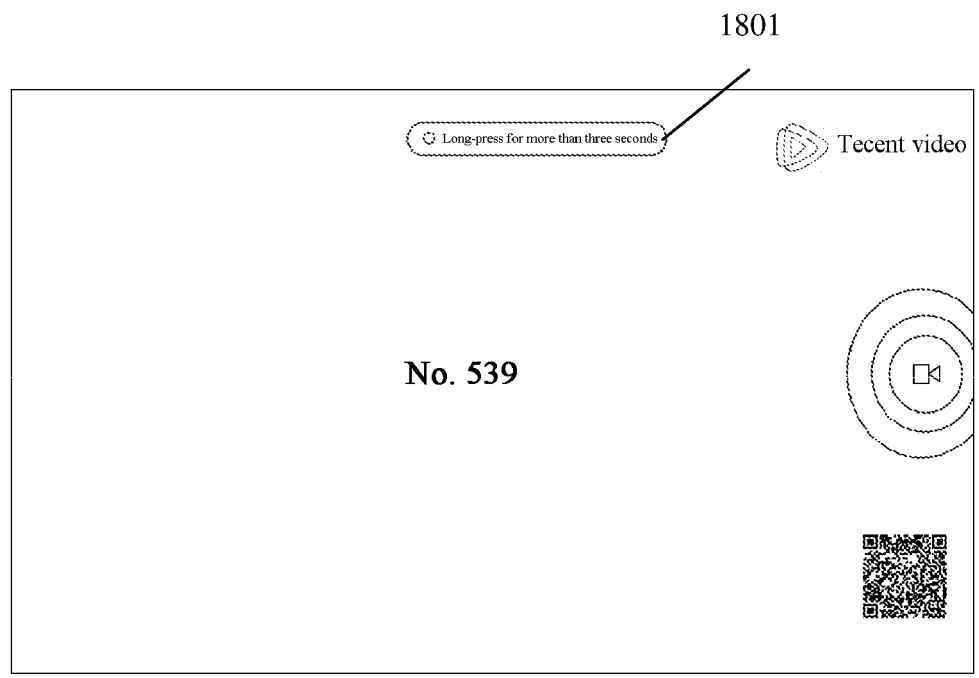
FIG. 18 is a schematic demonstration diagram of a recording state in which a preset recording duration is not reached on a full-screen player according to an example embodiment of this application.

FIG. 18 is a schematic demonstration diagram of a recording state in which a recording duration is less than a preset recording duration on a full-screen player according to an example embodiment of this application. As shown in FIG. 18, the recording state includes a state in which the recording duration is less than the preset recording duration. For example, when the recording duration is less than three seconds, a recording progress 1801 at the top of a screen of the full-screen player is displayed in orange, and a prompt is "long-press for more than three seconds."

Figure 19:
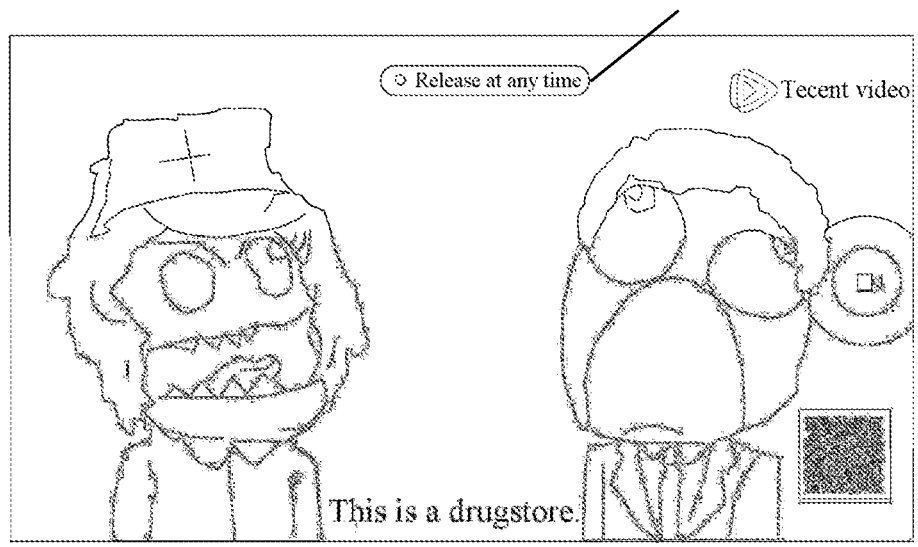
FIG. 19 is a schematic demonstration diagram of a recording state in which a preset recording duration is exceeded on a full-screen player according to an example embodiment of this application.

FIG. 19 is a schematic demonstration diagram of a recording state in which a recording duration is greater than a preset recording duration on a full-screen player according to an example embodiment of this application. As shown in FIG. 19, when the recording duration is greater than the preset recording duration, for example, when the recording duration is greater than three seconds, a recording progress bar 1901 at the top of the full-screen player becomes green, and a prompt is "release at any time," to prompt that the user may end a recording process at any time.

Figure 20:
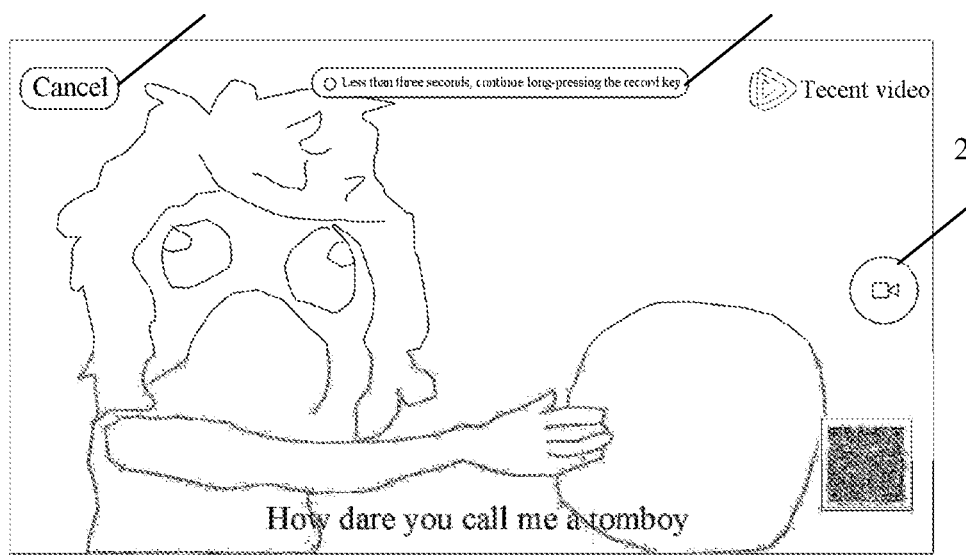
FIG. 20 is a schematic demonstration diagram of a recording pause state on a full-screen player according to an example embodiment of this application.

FIG. 20 is a schematic demonstration diagram of a recording pause state on a full-screen player according to an example embodiment of this application. As shown in FIG. 20, in the recording pause state, if a finger of a user leaves a record key 2001 when a recording duration is less than a preset recording duration, for example, the finger of the user leaves the record key 2001 when the recording duration is less than three seconds, a recording pause mode is entered. In the recording pause mode, a recording progress bar 2002 holds still. When a hand leaves the record key 2001, a prompt is "less than three seconds, continue long-pressing the record key," to prompt the user terminal to continue long-pressing the record key 2001 to record the target video. There is a cancellation key 2003 at a top left corner of the full-screen player, and a user terminal taps on the cancellation key 2003 to cancel recording of the target video of this time. When the user terminal continues to tap the record key 2001, a recording instruction signal is generated on a video recording page, to continue the process of recording the target video. This achieves a technical effect of recording an online video and improves performance experience of the user terminal on recording of the online video.

Figure 21:
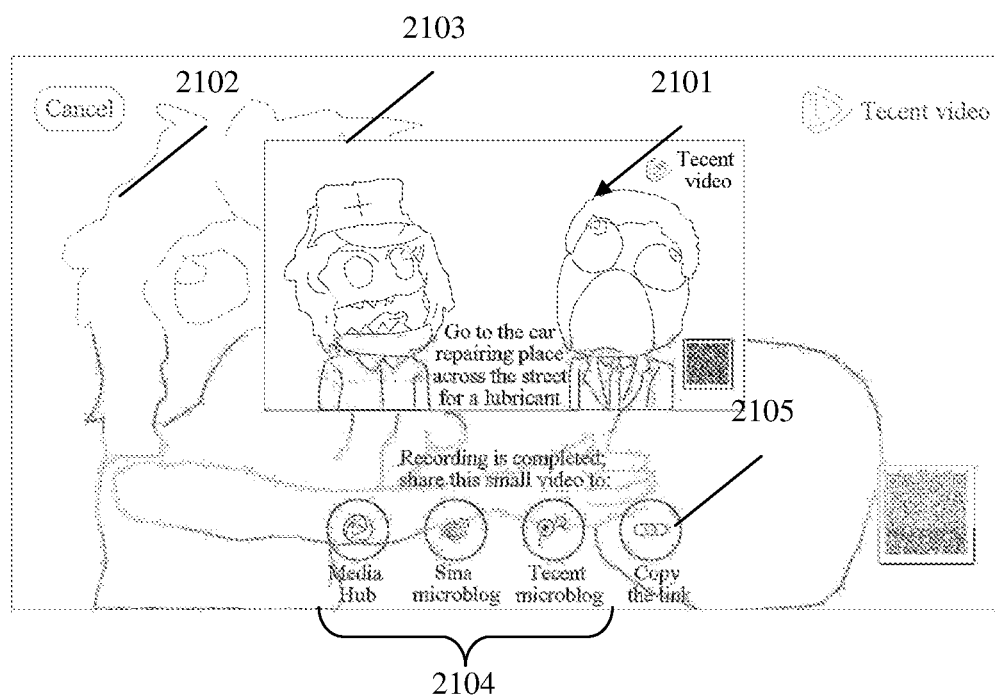
FIG. 21 is a schematic demonstration diagram of a video clip preview state on a full-screen player according to an example embodiment of this application.

FIG. 21 is a schematic demonstration diagram of a video clip preview state on a full-screen player according to an example embodiment of this application. As shown in FIG. 21, if a finger of a user leaves a record key when a recording duration is greater than three seconds, or when the recording duration is greater than eight seconds, a video clip preview mode is entered, so that a recorded video is in a video clip preview state. In the video clip preview mode, the full-screen player quickly becomes smaller. In a change process of the full-screen player, the player pauses playing, and a video clip recorded just now is circularly played by using the smaller player, that is, by using a second playback page 2101. There is a cancellation key 2102 at a top left corner of a screen of the player, and a user terminal taps on the cancellation key to close the second playback page 2101 and return to a first playback page 2103 to continue watching a target video. There are sharing entries 2104 of multiple social platforms at the bottom of the screen of the player, and the user terminal may be prompted, by displaying prompt information "recording is completed; share this small video to:," to share a recorded video corresponding to a recorded video clip to other social platforms. For example, the recorded video is shared to Media Hub, Sina microblog, Tencent microblog, and the like. The recorded video, that is, a small video, is a video composed of a small clip in the target video. There is a link copying function area 2105 at the bottom of the screen of the player. When a copying instruction signal is received by using the link copying area 2105, a page link address is copied to a clipboard, and information for prompting successful copying of the page link address is displayed. After the information for prompting successful copying of the page link address is displayed, a recorded video corresponding to the page link address is searched for by using a target search area, thereby achieving a technical effect of recording an online video and improving performance experience of the user terminal on recording of the online video.

In this example embodiment of this application, recording of a video clip played online is a product idea of a terminal video APP. The product can satisfy a desire of the user terminal in recording the target video online in a process of watching the video, obtaining the recorded video, and sharing the recorded video to a used social platform. In a whole process of recording the target video online, a human-machine interaction design in a video recording process is humanized and interesting and can enhance product user experience of the terminal video APP. The recorded video after recording is uploaded to the server by using a binary transfer method, reducing time costs and bandwidth costs of recording of the target video, and the server generates the recorded video, lowering a probability of generation of a video error and improving a recording success rate of recording the target video online.

It may be noted that for descriptions, the foregoing method example embodiments are stated as a series of action combinations. This application is not limited to the sequence of the described actions because according to this application, some steps may be performed in another sequence or simultaneously. Secondly, actions and modules involved in the example embodiments described in this specification are not necessarily needed in this application.

Based on the foregoing descriptions of the example embodiments, it may be clearly understood that the method in the foregoing example embodiments may be implemented by software in addition to a universal hardware platform or by hardware only. However, the former is a better implementation in most cases. Based on such understanding, the technical solutions of this application or some contributing to the existing technology may be implemented in a form of a software product. The computer software product is stored in a storage medium, such as a read-only memory (ROM)/random access memory (RAM), a magnetic disk, or an optical disc) and includes several instructions for instructing a terminal device (which may be a mobile phone, a computer, a server, a network device, or the like) to perform the methods described in the example embodiments of this application.

According to an example embodiment of this application, an apparatus for performing the foregoing video recording method of a mobile terminal is further provided below.

Figure 22:
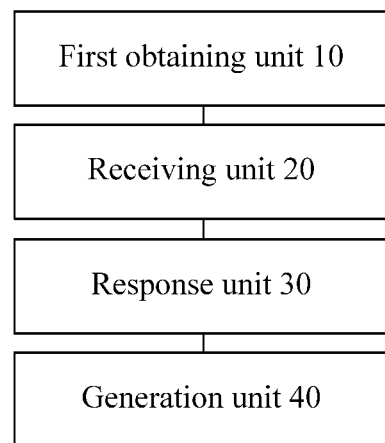
FIG. 22 is a schematic diagram of a video recording apparatus of a mobile terminal according to the first example embodiment of this application.

FIG. 22 is a schematic diagram of a video recording apparatus of a mobile terminal according to the first example embodiment of this application. As shown in FIG. 22, the schematic diagram of the video recording apparatus of a mobile terminal includes: a first obtaining unit 10, a receiving unit 20, a response unit 30, and a generation unit 40.

In the video recording apparatus of a mobile terminal in this example embodiment, the first obtaining unit 10 may be configured to perform step S202 in the example embodiments of this application; the receiving unit 20 may be configured to perform step S204 in the example embodiments of this application; the response unit 30 may be configured to perform step S206 in the example embodiments of this application; the response unit 30 is configured to perform step S208 in the example embodiments of this application.

The first obtaining unit 10 is configured to obtain a target video played online, the target video being a video to be recorded.

The receiving unit 20 is configured to receive, by using a video recording page, a recording instruction signal for recording the target video.

The response unit 30 is configured to enter a recording mode in response to the recording instruction signal, the target video being recorded in the recording mode, to obtain a video clip corresponding to video data of the target video.

The generation unit 40 is configured to generate a recorded video of the target video according to the video clip.

Figure 23:
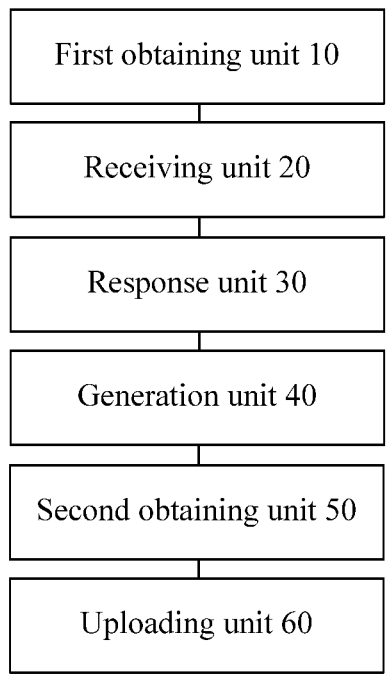
FIG. 23 is a schematic diagram of a video recording apparatus of a mobile terminal according to the second example embodiment of this application.

FIG. 23 is a schematic diagram of a video recording apparatus of a mobile terminal according to the second example embodiment of this application. As shown in FIG. 23, the video recording apparatus of a mobile terminal includes a second obtaining unit 50 and an uploading unit 60.

The second obtaining unit 50 is configured to obtain identification information of the video clip after the recording mode is entered in response to the recording instruction signal, where the identification information is information for determining the video clip.

The uploading unit 60 is configured to upload the identification information of the video clip to a server, where the server searches for a video clip corresponding to the identification information of the video clip and generates the recorded video of the target video according to the found video clip.

Optionally, the second obtaining unit 50 is configured to obtain an ID, a recording start frame number, and a recording stop frame number of the target video. The uploading unit 60 is configured to upload the ID, the recording start frame number, and the recording stop frame number of the target video to the server, where the server searches for a video clip between the recording start frame number and the recording stop frame number according to the ID of the target video, performs an encoding and decoding operation on the video clip between the recording start frame number and the recording stop frame number, and generates a recorded video corresponding to the video clip between the recording start frame number and the recording stop frame number.

Optionally, the response unit 30 includes a first obtaining module, a first judging module, a first determining module, and a second determining module. The first obtaining module is configured to obtain a recording duration for which the target video is recorded, where the recording duration is a period of time for which the recording instruction signal for recording the target video has been received by using the video recording page. The first judging module is configured to determine whether the recording duration is less than or equal to a preset recording duration. The first determining module is configured to determine entering a recording pause mode if it is determined that the recording duration is less than or equal to the preset recording duration, where recording of the target video is paused in the recording pause mode, and the recording mode is entered when the video recording page receives the recording instruction signal again. The second determining module is configured to enter a video clip preview mode if it is determined that the recording duration is greater than the preset recording duration, where the recorded video corresponding to the video clip is displayed in the video clip preview mode.

Optionally, the first determining module includes a first control sub-module, a second control sub-module, and a first display sub-module. The first control sub-module is configured to control the target video to stop being played. The second control sub-module is configured to control a recording progress of the target video to stop. The first display sub-module is configured to display a first control cancellation area on the video recording page, where recording of the target video is canceled when a first instruction cancellation signal is received by using the first control cancellation area.

Optionally, the response unit 30 further includes a first execution module and a second execution module. The first execution module is configured to, after whether the recording duration is less than or equal to a preset recording duration is determined, output first prompt information and/or control a progress bar of the recording progress to be displayed in a first preset color if it is determined that the recording duration is less than or equal to the preset recording duration, where the first prompt information is operation information for prompting to continue generating the video clip. The second execution module is configured to output second prompt information and/or control the progress bar of the recording progress to be displayed in a second preset color if it is determined that the recording duration is greater than the preset recording duration, where the second prompt information is operation information for prompting to end generating the video clip.

Optionally, the second determining module includes a narrowing sub-module and a first obtaining sub-module. The video recording page includes a first playback page, and the first playback page is a page for displaying the target video. The narrowing sub-module is configured to narrow the first playback page, to obtain a second playback page. The first obtaining sub-module is configured to obtain a video clip of the recording duration, where the generation unit 40 is configured to generate the recorded video according to the video clip of the recording duration and display the recorded video by using the second playback page.

Optionally, the second determining module further includes a second obtaining sub-module, a second display sub-module, and a third display sub-module. The second obtaining sub-module is configured to, after the first playback page is narrowed to obtain a second playback page, obtain a screenshot picture of the target video and use the screenshot picture as a background picture of the second playback page. The second display sub-module is configured to display a second control cancellation area, where display of the recorded video is canceled when a second instruction cancellation signal is received by using the second control cancellation area, the second playback page is restored to the first playback page, and the first playback page continues displaying the target video. The third display sub-module is configured to display a sharing function area, where the recorded video is shared to a social platform corresponding to the sharing function area when the sharing instruction signal is received by using the sharing function area.

Optionally, after the video clip preview mode is entered if it is determined that the recording duration is greater than the preset recording duration, the uploading unit 60 is configured to upload information about the video clip of the target video to a server, where the server generates information about a recorded video composed of the video clip and sends the information about the recorded video to a mobile terminal when the information about the video clip of the target video is successfully uploaded to the server. The response unit 30 further includes a receiving module and a display module. The receiving module is configured to receive the sharing instruction signal by using the sharing function area and send the recorded video to the social platform corresponding to the sharing function area when the information about the video clip is successfully uploaded to the server. The display module is configured to display that the recorded video is in a loading state when the information about the video clip is not successfully uploaded to the server.

Optionally, the sharing function area includes a link copying area, used for obtaining a page link address of the recorded video, and the second determining module further includes a copying module and a searching module. The copying module is configured to, after the first playback page is narrowed to obtain a second playback page, copy the page link address to a clipboard and display third prompt information when a copying instruction signal is received by using the link copying area, where the third prompt information is information for prompting successful copying of the page link address. The searching module is configured to search for a recorded video corresponding to the page link address by using a target search area after the third prompt information is displayed.

Optionally, the video recording apparatus of a mobile terminal further includes an output unit, configured to, after the recording instruction signal for recording the target video is received by using the video recording page, output fourth prompt information if the target video is in a loading state before recording of the target video starts, where the fourth prompt information is information for prompting that the target video is in the loading state and cannot enter a recording mode. The first determining module is further configured to enter the recording pause mode and output fifth prompt information when the target video is converted from a playing state into a loading state if the target video is in a recording state when the target video is recorded, where the fifth prompt information is information for prompting that a network of the target video is unstable. The response unit 30 further includes a controlling module, configured to: control the target video to remain in a recording pause state in the recording pause mode when the target video is converted from the playing state into the loading state if the target video is in the recording pause mode when the target video is recorded; and control the target video to remain in the recording pause state in the recording pause mode if the recording instruction signal for recording the target video is not received by using the video recording page when the target video is converted from the loading state into the playing state if the target video is in the recording pause mode when the target video is recorded. The generation unit 40 is further configured to continue recording the target video and generate the video clip corresponding to the video data of the target video if the recording instruction signal for recording the target video is received by using the video recording page when the target video is converted from the loading state into the playing state if the target video is in the recording pause mode when the target video is recorded.

Optionally, the response unit 30 further includes a second obtaining module, a second judging module, an output module, and a response module. The second obtaining module is configured to respectively obtain start time of recording of the target video and end time of playing of the target video. The second judging module is configured to: determine whether a time difference between the start time and the end time is less than a first preset time difference; and determine whether the time difference between the start time and the end time is less than a second preset time difference if it is determined that the time difference between the start time and the end time is less than the first preset time difference. The output module is configured to output prompt information prompting that the target video cannot be recorded if it is determined that the time difference between the start time and the end time is less than the second preset time difference. The response module is configured to enter the recording mode in response to the recording instruction signal and end recording of the target video before playing of the target video ends if it is determined that the time difference between the start time and the end time is greater than or equal to the second preset time difference.

In this example embodiment of this application, the first obtaining unit 10 obtains the target video played online, the target video played online being the video to be recorded. The receiving unit 20 receives, by using the video recording page, the recording instruction signal for recording the target video. The response unit 30 enters the recording mode in response to the recording instruction signal, the target video being recorded in the recording mode, to obtain the video clip corresponding to the video data of the target video. The generation unit 40 generates the recorded video of the target video according to the video clip. This application achieves an effect of recording an online video.

An example embodiment of this application further provides a storage medium. Optionally, in this example embodiment, the storage medium may be configured to save program code executed by the video recording method of a mobile terminal according to the foregoing example embodiments.

Optionally, in this example embodiment, the storage medium may be located in any one or any combination of multiple network devices in a computer network.

Optionally, in this example embodiment, the storage medium is configured to store program code used for performing the following steps:

obtaining a target video played online, the target video being a video to be recorded;

receiving, by using a video recording page, a recording instruction signal for recording the target video;

entering a recording mode in response to the recording instruction signal, the target video being recorded in the recording mode, to obtain a video clip corresponding to video data of the target video; and generating a recorded video of the target video according to the video clip.

Optionally, the storage medium is further configured to store program code used for performing the following steps: obtaining identification information of the video clip, where the identification information is information for determining the video clip; and uploading the identification information of the video clip to a server, where the server searches for a video clip corresponding to the identification information of the video clip and generates the recorded video of the target video according to the found video clip.

Optionally, the storage medium is further configured to store program code used for performing the following steps: obtaining an ID, a recording start frame number, and a recording stop frame number of the target video; and the uploading the identification information of the video clip to a server includes: uploading the ID, the recording start frame number, and the recording stop frame number of the target video to the server, where the server searches for a video clip between the recording start frame number and the recording stop frame number according to the ID of the target video, performs an encoding and decoding operation on the video clip between the recording start frame number and the recording stop frame number, and generates a recorded video corresponding to the video clip between the recording start frame number and the recording stop frame number.

Optionally, the storage medium is further configured to store program code used for performing the following steps: obtaining an ID, a recording start frame number, and a recording stop frame number of the target video; and the uploading the identification information of the video clip to a server includes: uploading the ID, the recording start frame number, and the recording stop frame number of the target video to the server, where the server searches for a video clip between the recording start frame number and the recording stop frame number according to the ID of the target video, performs an encoding and decoding operation on the video clip between the recording start frame number and the recording stop frame number, and generates a recorded video corresponding to the video clip between the recording start frame number and the recording stop frame number.

Optionally, the storage medium is further configured to store program code used for performing the following steps: controlling the target video to stop being played; controlling a recording progress of the target video to stop; and displaying a first control cancellation area on the video recording page, where recording of the target video is canceled when a first instruction cancellation signal is received by using the first control cancellation area.

Optionally, the storage medium is further configured to store program code used for performing the following steps: outputting first prompt information and/or controlling a progress bar of the recording progress to be displayed in a first preset color if it is determined that the recording duration is less than or equal to the preset recording duration, where the first prompt information is operation information for prompting to continue generating the video clip; and outputting second prompt information and/or controlling the progress bar of the recording progress to be displayed in a second preset color if it is determined that the recording duration is greater than the preset recording duration, where the second prompt information is operation information for prompting to end generating the video clip.

Optionally, the storage medium is further configured to store program code used for performing the following steps: narrowing the first playback page, to obtain a second playback page; and obtaining a video clip of the recording duration, where the generating a recorded video of the target video according to the video clip includes: generating the recorded video according to the video clip of the recording duration and displaying the recorded video by using the second playback page.

Optionally, the storage medium is further configured to store program code used for performing the following steps: obtaining a screenshot picture of the target video and using the screenshot picture as a background picture of the second playback page; displaying a second control cancellation area, where display of the recorded video is canceled when a second instruction cancellation signal is received by using the second control cancellation area, the second playback page is restored to the first playback page, and the first playback page continues displaying the target video; and displaying a sharing function area, where the recorded video is shared to a social platform corresponding to the sharing function area when the sharing instruction signal is received by using the sharing function area.

Optionally, the storage medium is further configured to store program code used for performing the following steps: uploading information about the video clip of the target video to a server, where the server generates information about a recorded video composed of the video clip and sends the information about the recorded video to a mobile terminal when the information about the video clip of the target video is successfully uploaded to the server; receiving the sharing instruction signal by using the sharing function area and sending the recorded video to the social platform corresponding to the sharing function area when the information about the video clip is successfully uploaded to the server; and displaying that the recorded video is in a loading state when the information about the video clip is not successfully uploaded to the server.

Optionally, the storage medium is further configured to store program code used for performing the following steps: copying the page link address to a clipboard and displaying third prompt information when a copying instruction signal is received by using the link copying area, where the third prompt information is information for prompting successful copying of the page link address; and searching for a recorded video corresponding to the page link address by using a target search area after the third prompt information is displayed.

Optionally, the storage medium is further configured to store program code used for performing the following steps: outputting fourth prompt information if the target video is in a loading state before recording of the target video starts, where the fourth prompt information is information for prompting that the target video is in the loading state and cannot enter the recording mode; the entering a recording mode in response to the recording instruction signal, to obtain a video clip corresponding to video data of the target video includes: entering the recording pause mode and outputting fifth prompt information when the target video is converted from a playing state into the loading state if the target video is in a recording state when the target video is recorded, where the fifth prompt information is information for prompting that a network of the target video is unstable; controlling the target video to remain in a recording pause state in the recording pause mode when the target video is converted from the playing state into the loading state if the target video is in the recording pause mode when the target video is recorded; controlling the target video to remain in the recording pause state in the recording pause mode if the recording instruction signal for recording the target video is not received by using the video recording page when the target video is converted from the loading state into the playing state if the target video is in the recording pause mode when the target video is recorded; and continuing recording the target video and generating the video clip corresponding to the video data of the target video if the recording instruction signal for recording the target video is received by using the video recording page when the target video is converted from the loading state into the playing state if the target video is in the recording pause mode when the target video is recorded.

The storage medium is further configured to store program code used for performing the following steps: respectively obtaining start time of recording of the target video and end time of playing of the target video; determining whether a time difference between the start time and the end time is less than a first preset time difference; determining whether the time difference between the start time and the end time is less than a second preset time difference if it is determined that the time difference between the start time and the end time is less than the first preset time difference; outputting prompt information prompting that the target video cannot be recorded if it is determined that the time difference between the start time and the end time is less than the second preset time difference; and entering the recording mode in response to the recording instruction signal and ending recording of the target video before playing of the target video ends if it is determined that the time difference between the start time and the end time is greater than or equal to the second preset time difference.

Optionally, in this example embodiment, the storage medium may include, but is not limited to: any medium that can store program code, such as a USB flash drive, a read only memory (ROM), a random access memory (RAM), a removable hard disk, a magnetic disk, or an optical disc.

An example embodiment of this application further provides a computer terminal, and the computer terminal may be any computer terminal device in a computer terminal group. Optionally, in this example embodiment, the computer terminal may also be replaced with a terminal device such as a mobile terminal.

Optionally, in this example embodiment, the computer terminal may be located in any one or any combination of multiple network devices in a computer network.

Figure 24:
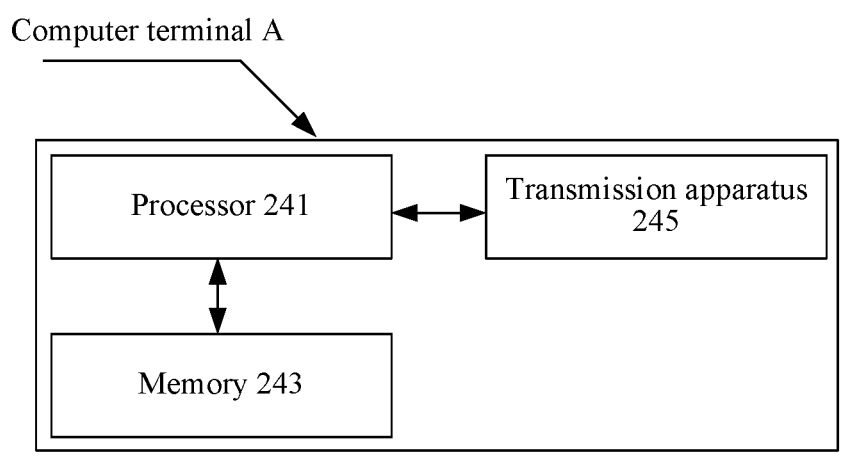
FIG. 24 is a structural block diagram of a computer terminal according to an example embodiment of this application.

FIG. 24 is a structural block diagram of a computer terminal A according to an example embodiment of this application. As shown in FIG. 24, the computer terminal A may include: one or more (only one is shown in the figure) processors 241, a memory 243, and a transmission apparatus 245 or transceiver.

The memory 243 may be configured to store a software program and a module, for example, a program instruction/module corresponding to the video recording method and apparatus of a mobile terminal in the example embodiments of this application, and the processor 241 executes various functional applications and data processing by running the software program and the module stored in the memory 243, that is, implementing the foregoing video recording method of a mobile terminal. The memory 243 may include a high-speed random memory, and may also include a nonvolatile memory such as one or more magnetic storage apparatuses, a flash memory, or another nonvolatile solid-state memory. In some example embodiments, the memory 243 may further include memories remotely disposed relative to the processor 241, and these remote memories may be connected to the computer terminal A through a network. Examples of the network include, but are not limited to, the Internet, an intranet, a local area network, a mobile communications network, and a combination thereof.

The transmission apparatus 245 or transceiver is configured to receive or send data through a network. Examples of the network may include a wired network and a wireless network. In an example, the transmission apparatus 245 includes a network interface controller (NIC) that may be connected to another network device and a router by using a network cable, thereby communicating with the Internet or a local area network. In an example, the transmission apparatus 245 is a radio frequency (RF) module that is configured to communicate with the Internet in a wireless manner.

The memory 243 is configured to store information about a preset action condition and a preset privileged user, and an application.

The processor 241 may invoke, by using the transmission apparatus, the information and the application stored in the memory 243, to perform the following steps:

obtaining a target video played online, the target video being a video to be recorded;

receiving, by using a video recording page, a recording instruction signal for recording the target video;

entering a recording mode in response to the recording instruction signal, the target video being recorded in the recording mode, to obtain a video clip corresponding to video data of the target video; and generating a recorded video of the target video according to the video clip.

For an example in this example embodiment, refer to the examples described in the first and second example embodiments, and details are not described in this example embodiment.

The sequence numbers of the foregoing example embodiments of this application are for description purpose but do not indicate the preference of the example embodiments.

If the foregoing integrated units in the foregoing example embodiments are implemented in a form of software functional units and are sold or used as an independent product, the units may be stored in a computer readable storage medium. Based on such understanding, the technical solutions of this application, or some contributing to the existing technology, or all or some of the technical solutions may be implemented in a form of a software product. The computer software product is stored in a storage medium and includes several instructions for instructing one or more computer devices (which may be a personal computer, a server, a network device, or the like) to perform all or some of steps of the methods in the example embodiments of this application.

In the foregoing example embodiments of this application, descriptions of the example embodiments have different emphases, and as for parts that are not described in detail in one example embodiment, reference can be made to the relevant descriptions of the other example embodiments.

In the several example embodiments provided in this application, it may be understood that the disclosed client may be implemented in other manners. The described apparatus example embodiments are schematic. For example, division of the units is division of logic functions, and there may be another division manner during actual implementation. For example, multiple units or components may be combined or may be integrated into another system, or some features may be omitted or not be executed. In addition, the displayed or discussed mutual coupling, or direct coupling, or communication connections may be implemented through some interfaces. Indirect coupling or communication connections between the units or modules may be implemented in electronic or other forms.

The units described as separate parts may or may not be physically separate, and the parts displayed as units may or may not be physical units, that is, may be located at one position, or may be distributed on a plurality of network units. Some of or all of the units may be selected according to actual needs to achieve the objectives of the solutions of the example embodiments.

In addition, functional units in the example embodiments of this application may be integrated into one processing unit, or each of the units may exist alone physically, or two or more units may be integrated into one unit. The integrated units may be implemented in a form of hardware or may be implemented in a form of a software functional module.

The above descriptions are implementations of this application, and it may be noted that a person of ordinary skill in the art can make various improvements and refinements without departing from the spirit of this application. All such modifications and refinements may also be intended to be covered by this application.

What is claimed is:

1. A video recording method of a mobile terminal, the method comprising:

obtaining a target video that is played online;

controlling to display a video recording page in which the target video is played;

receiving, via the video recording page that is displayed, a recording instruction for recording the target video;

entering a recording mode to record the target video, in response to the recording instruction being received, to obtain a first video clip corresponding to video data of the target video;

obtaining a recording duration for which the target video is recorded, wherein the recording duration is a period of time for which the recording instruction is received via the video recording page that is displayed, before the recording instruction stops being received via the video recording page that is displayed;

determining whether the recording duration is less than or equal to a preset recording duration;

entering a recording pause mode to pause recording of the target video, in response to the recording duration being determined to be less than or equal to the preset recording duration;

reentering the recording mode to record the target video, in response to the recording instruction being received while the recording pause mode is entered;

entering a video clip preview mode to display a recorded video corresponding to the first video clip, in response to the recording duration being determined to be greater than the preset recording duration; and generating the recorded video of the target video, based on the first video clip.

2. The method according to claim 1, further comprising, based on the recording mode being entered:

obtaining identification information of the first video clip; and controlling to upload the identification information to a server, wherein the server searches for a second video clip corresponding to the identification information and generates the recorded video, based on the second video clip that is found.

3. The method according to claim 2, wherein the identification information of the first video clip comprises an identification, a recording start frame number, and a recording stop frame number of the target video, and wherein the server searches for the second video clip between the recording start frame number and the recording stop frame number, based on the identification, and performs an encoding and decoding operation on the second video clip that is found, to generate the recorded video.

4. The method according to claim 1, wherein the entering of the recording pause mode comprises:

controlling to pause the target video from being played;

controlling to pause a recording progress of the target video;

controlling to display a first control cancellation area on the video recording page that is displayed;

receiving, via the first control cancellation area that is displayed, a first instruction cancellation; and controlling to cancel recording of the target video, in response to the first instruction cancellation being received.

5. The method according to claim 1, further comprising:

controlling to display first prompt information and/or a progress bar of a recording progress of the target video to be displayed in a first preset color, in response to the recording duration being determined to be less than or equal to the preset recording duration, wherein the first prompt information is for prompting to continue the obtaining of the first video clip; and controlling to display second prompt information and/or the progress bar of the recording progress to be displayed in a second preset color, in response to the recording duration being determined to be greater than the preset recording duration, wherein the second prompt information is for prompting to end the obtaining of the first video clip.

6. The method according to claim 1, wherein the video recording page comprises a first playback page in which the target video is played, the entering of the video clip preview mode comprises:

changing the first playback page to display a second playback page; and obtaining the first video clip of the recording duration, the generating of the recorded video comprises generating the recorded video, based on the first video clip of the recording duration, and the method further comprises controlling to display the recorded video in the second playback page that is displayed.

7. The method according to claim 6, wherein the entering of the video clip preview mode further comprises:

obtaining a screenshot picture of the target video;

controlling to display the screenshot picture as a background picture of the second playback page that is displayed;

controlling to display a second control cancellation area on the second playback page that is displayed; and controlling to display a sharing function area on the second playback page that is displayed;

receiving, via the second control cancellation area that is displayed, a second instruction cancellation;

in response to the second instruction cancellation being received:

controlling to cancel display of the recorded video in the second playback page that is displayed; and restoring the second playback page to the first playback page in which the target video resumes being played;

receiving, via the sharing function area, a sharing instruction; and in response to the sharing instruction being received, controlling to share the recorded video to a social platform corresponding to the sharing function area.

8. The method according to claim 7, wherein the entering of the video clip preview mode further comprises:

uploading video clip information of the first video clip, to a server, wherein the server generates recorded video information of the recorded video that is composed of the first video clip and sends the recorded video information to the mobile terminal, in response to the video clip information being successfully uploaded to the server, and the controlling to share the recorded video comprises controlling to share the recorded video to the social platform corresponding to the sharing function area, in response to the sharing instruction being received and the video clip information being successfully uploaded to the server; and controlling to display that the recorded video is in a loading state, in response to the video clip information being unsuccessfully uploaded to the server.

9. The method according to claim 7, wherein the sharing function area comprises a link copying area for copying a page link address of the recorded video that is displayed, and the entering of the video clip preview mode further comprises:

obtaining, via the link copying area, a copying instruction;

copying the page link address to a clipboard and displaying third prompt information, in response to the copying instruction being received, wherein the third prompt information is for prompting successful copying of the page link address; and searching for the recorded video corresponding to the page link address, using a target search area, based on the third prompt information being displayed.

10. The method according to claim 1, wherein the entering of the recording mode comprises:

outputting fourth prompt information, in response to the target video being in a loading state before recording of the target video starts, wherein the fourth prompt information is for prompting that the target video is in the loading state and cannot enter the recording mode;

entering a recording pause mode to pause recording of the target video, and outputting fifth prompt information, in response to the target video being converted from a playing state into the loading state if the target video is in a recording state when the target video is recorded, wherein the fifth prompt information is for prompting that a network of the target video is unstable;

controlling the target video to remain in a recording pause state in the recording pause mode, in response to the target video being converted from the playing state into the loading state if the target video is in the recording pause mode when the target video is recorded;

controlling the target video to remain in the recording pause state in the recording pause mode, based on the recording instruction being not received when the target video is converted from the loading state into the playing state if the target video is in the recording pause mode when the target video is recorded; and continuing recording the target video and generating the first video clip, in response to the recording instruction being received when the target video is converted from the loading state into the playing state if the target video is in the recording pause mode when the target video is recorded.

11. The method according to claim 1, wherein the entering of the recording mode comprises:

obtaining a start time of recording of the target video and an end time of playing of the target video;

determining whether a time difference between the start time and the end time is less than a first preset time difference;

determining whether the time difference between the start time and the end time is less than a second preset time difference, in response to the time difference being determined to be less than the first preset time difference;

outputting prompt information prompting that the target video cannot be recorded, in response to the time difference being determined to be less than the second preset time difference; and ending recording of the target video before playing of the target video ends, in response to the time difference being determined to be greater than or equal to the second preset time difference.

12. The method according to claim 1, wherein the video recording page comprises a record key, and the recording instruction comprises pressing the record key.

13. The method according to claim 12, further comprising, in response to the recording instruction being received, controlling to display, on the video recording page, a first prompt prompting the pressing of the record key for more than a predetermined period of time.

14. The method according to claim 13, further comprising:

determining whether the pressing of the record key is for more than the predetermined period of time; and in response to the pressing of the record key being determined to be for more than the predetermined of time, controlling to display, on the video recording page, a second prompt prompting a release of the record key.

15. The method according to claim 14, further comprising, in response to the pressing of the record key being determined to be for less than or equal to the predetermined of time:

controlling to pause the target video from being played;

controlling to pause a recording progress of the target video; and controlling to display, on the video recording page, a third prompt prompting the pressing of the record key for more than the predetermined period of time.

16. A video recording apparatus of a mobile terminal, the apparatus comprising:

a processor; and a memory storing instructions executable by the processor to cause the processor to:

obtain a target video that is played online;

control to display a video recording page in which the target video is played;

receive, via the video recording page that is displayed, a recording instruction for recording the target video;

enter a recording mode to record the target video, in response to the recording instruction being received, to obtain a first video clip corresponding to video data of the target video;

obtain a recording duration for which the target video is recorded, wherein the recording duration is a period of time for which the recording instruction is received via the video recording page that is displayed, before the recording instruction stops being received via the video recording page that is displayed;

determine whether the recording duration is less than or equal to a preset recording duration;

enter a recording pause mode to pause recording of the target video, in response to the recording duration being determined to be less than or equal to the preset recording duration;

reenter the recording mode to record the target video, in response to the recording instruction being received while the recording pause mode is entered;

enter a video clip preview mode to display a recorded video corresponding to the first video clip, in response to the recording duration being determined to be greater than the preset recording duration; and generate the recorded video of the target video, based on the first video clip.

17. The apparatus according to claim 16, wherein the instructions are further executable by the processor to cause the processor to:

obtain identification information of the first video clip; and control to upload the identification information to a server, wherein the server searches for a second video clip corresponding to the identification information and generates the recorded video, based on the second video clip that is found.

18. A non-transitory computer-readable storage medium storing a program comprising instructions executable by a processor to cause the processor to:

obtain a target video that is played online;

control to display a video recording page in which the target video is played;

receive, via the video recording page that is displayed, a recording instruction for recording the target video;

enter a recording mode to record the target video, in response to the recording instruction being received, to obtain a first video clip corresponding to video data of the target video;

obtain a recording duration for which the target video is recorded, wherein the recording duration is a period of time for which the recording instruction is received via the video recording page that is displayed, before the recording instruction stops being received via the video recording page that is displayed;

determine whether the recording duration is less than or equal to a preset recording duration;

enter a recording pause mode to pause recording of the target video, in response to the recording duration being determined to be less than or equal to the preset recording duration;

reenter the recording mode to record the target video, in response to the recording instruction being received while the recording pause mode is entered;

enter a video clip preview mode to display a recorded video corresponding to the first video clip, in response to the recording duration being determined to be greater than the preset recording duration; and generate the recorded video of the target video, based on the first video clip.

19. The non-transitory computer-readable storage medium according to claim 18, wherein the instructions are further executable by the processor to cause the processor to:

obtain identification information of the first video clip; and control to upload the identification information to a server, wherein the server searches for a second video clip corresponding to the identification information and generates the recorded video, based on the second video clip that is found.

* * * * *